United States Patent
Al-Harthi et al.

(10) Patent No.: US 11,479,646 B2
(45) Date of Patent: Oct. 25, 2022

(54) METHOD FOR MAKING A PVA-GRAPHENE FILM

(71) Applicant: King Fahd University of Petroleum and Minerals, Dhahran (SA)

(72) Inventors: Mamdouh Ahmad Al-Harthi, Dhahran (SA); Hafiz Muhammad Afzal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/800,615

(22) Filed: Feb. 25, 2020

(65) Prior Publication Data
US 2020/0190271 A1 Jun. 18, 2020

Related U.S. Application Data

(62) Division of application No. 15/812,550, filed on Nov. 14, 2017, now Pat. No. 10,626,231.

(60) Provisional application No. 62/439,715, filed on Dec. 28, 2016.

(51) Int. Cl.
*C08J 5/00* (2006.01)
*C08J 3/28* (2006.01)
*C08K 3/04* (2006.01)
*C08J 5/18* (2006.01)

(52) U.S. Cl.
CPC ............ *C08J 5/005* (2013.01); *C08J 3/28* (2013.01); *C08J 5/18* (2013.01); *C08K 3/042* (2017.05); *C08J 2329/04* (2013.01); *C08K 2201/001* (2013.01); *C08K 2201/011* (2013.01)

(58) Field of Classification Search
CPC ....................................................... C08J 5/005
See application file for complete search history.

(56) References Cited

U.S. PATENT DOCUMENTS

2004/0211941 A1* 10/2004 Miyoshi ............... H01B 1/08
   252/500
2011/0218316 A1* 9/2011 Drysdale ............ C08G 63/6826
   528/299
2017/0166722 A1* 6/2017 Zhamu .................... B05D 1/02

FOREIGN PATENT DOCUMENTS

| CN | 103146024 A | 6/2013 |
| CN | 103571215   | 2/2014 |
| CN | 103146024 B | 7/2015 |

(Continued)

OTHER PUBLICATIONS

Joshi, A., et al, "Graphene nanoribbon-PVA composite as EMI shielding material in the X band," 2013, Nanotechnoloy, vol. 24, 455705. (Year: 2013).*

(Continued)

*Primary Examiner* — William D Young
(74) *Attorney, Agent, or Firm* — Oblon, McClelland, Maier & Neustadt, L.L.P.

(57) ABSTRACT

A process for making microwave-irradiated nanocomposites comprising graphene nanoplatelets dispersed in a polymer matrix, showing improved structural and electrical properties, is provided. The nanocomposites may be made using a solution casting technique, and may have a bilayer structure comprising a graphene-enriched layer in contact with a polymer-enriched layer. The nanocomposite may be used as a shielding material on electrical devices to decrease electromagnetic interference.

17 Claims, 18 Drawing Sheets

(56) References Cited

FOREIGN PATENT DOCUMENTS

CN          104451925          1/2017
KR          1236138 B1         2/2013

OTHER PUBLICATIONS

T. N. Zhou et al., "The preparation of the poly(vinyl alcohol)/graphene nanocomposites with low percolation threshold and high electrical conductivity by using the large-area reduced graphene oxide sheets," eXPRESS Polymer Letters, vol. 7, No. 9, May 19, 2013, 9 Pages. http://www.expresspolymlett.com/letolt.php?file=EPL-0004478&mi=dc.

Anupama Joshi et al., "Graphene nanoribbon—PVA composite as EMI shielding material in the X band," Nanotechnology, vol. 24, No. 45, Oct. 18, 2013, 8 Pages. http://iopscience.iop.org/article/10.1088/0957-4484/24/45/455705/meta.

Huang, H. D., et al., "High barrier graphene oxide nanosheet/poly(vinyl alcohol) nanocomposite films," Journal of Membrane Science, 409-410 (2012) 156-163. (Year: 2012).

\* cited by examiner

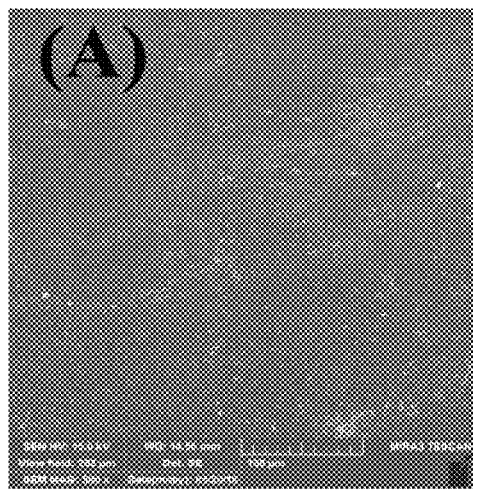
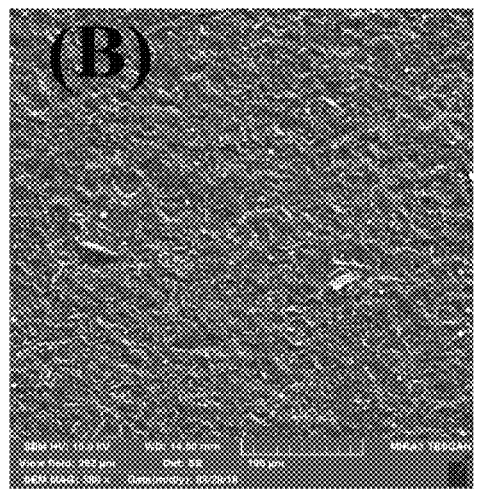
FIG. 2A
FIG. 2B
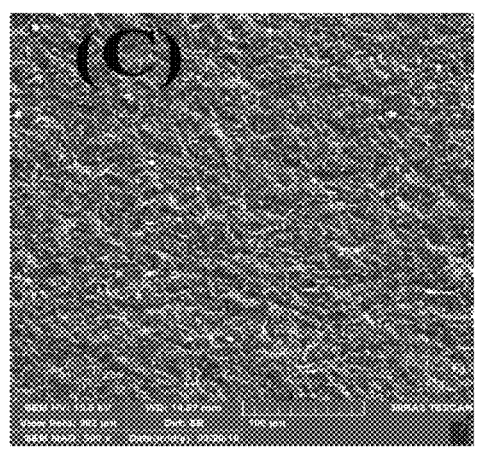
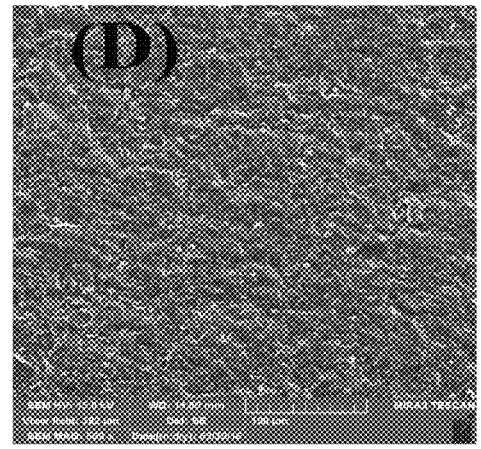
FIG. 2C
FIG. 2D

METHOD FOR MAKING A PVA-GRAPHENE FILM

CROSS REFERENCE TO RELATED APPLICATIONS

The present application is a Divisional of Ser. No. 15/812,550, now allowed, having a filing date of Nov. 14, 2017 and which claims benefit of priority to U.S. Provisional Application No. 62/439,715, having a filing date of Dec. 28, 2016 which is incorporated herein by reference in its entirety.

BACKGROUND OF THE INVENTION

Technical Field

The present invention relates to a method of making a nanocomposite of graphene dispersed in poly(vinyl alcohol).

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Poly(vinyl alcohol) (PVA), being a hydrophilic and biodegradable polymer, has been used in innumerable applications. PVA as a 'green polymer' provides a unique opportunity for comparative studies in relation to other organic polymers. See V. Goodship et al., *Polyvinyl alcohol: materials, processing and applications*, Smithers Rapra Press, 2009; N. Georgieva, et al., *Mater Lett* 88 (2012) 19-22; J. Wang, et al., *Polym Int* 60 (2011) 816-822; and P. Structures, "Polymer Structures," pp. 489-522, 1983. PVA nanocomposites with improved properties such as an increase in percent crystallinity, thermal stability, electrical/thermal conductivity, and mechanical strength have been reported. See H. Gleiter, "Materials with ultrafine microstructures: Retrospectives and perspectives," *Nanostructured Mater.* 1 (1992) 1-19; R. Surudžié, et al., *J. Ind. Eng. Chem.* 34 (2016) 250-257; J. Jose, et al., *Starch/Staerke*, 67 (2015) 147-153; P. A. Sreekumar, et al., *J. Appl. Polym. Sci.* 123 (2012) 135-142; J. Jose, et al., *Polym. Bull.* 71 (2014) 2787-2802; and M. Zubair, et al., *Surf Interface Anal.,* 46 (2014) 630-639—each incorporated herein by reference in its entirety. In the nano-filler family, carbon-containing nano-fillers, such as graphene and carbon nanotubes (CNTs), have acquired a huge attraction and interest among researchers. These nano-fillers possess remarkable properties like mechanical strength, thermal stability, electrical conductance, and a capability of being chemically functionalized. See M. Zubair, et al., *Surf Interface Anal.,* 46 (2014) 630-639—incorporated herein by reference in its entirety. Graphene has been in the spotlight in the nanotechnology field since 2004 because of its unprecedented properties. See K. K. Sadasivuni, et al., *Graphene-Based Polymer Nanocomposites in Electronics*, Springer, 2015; K. S. Novoselov, et al., *Science* 306 (2004) 666-9; and V. Dhand, et al., *J. Nanomater.* 2013 (2013) 763953—each incorporated herein by reference in its entirety. Graphene incorporated into a polymer matrix creates an extraordinary combination of thermal, mechanical and electrical properties as compared to other materials. See S. Park, et al., *Nat. Nanotechnol.* 4 (2009) 217-224; D. Li, et al., *Nat. Nanotechnol.,* 3 (2008) 101-105; and A. K. Geim, *Science* 324 (2009) 1530-4—each incorporated herein by reference in its entirety. Improved mechanical, electrical, and thermal properties of PVA nanocomposite with graphene incorporation have been reported. See J. Guo, et al., *Compos. Part B Eng.* 42 (2011) 2130-2135; G. W. Jeon, et al., *Compos. Part B Eng.* 43 (2012) 3412-3418; and J. Jose, et al., *J. Appl. Polym. Sci.,* 132 (2015) 1-8—each incorporated herein by reference in its entirety.

Nanocomposite crystallinity and electrical properties are of great interest and are furthermore tunable with different types of fillers. Crystallinity is a measure of the structural order of a solid material. A nanocomposite's crystallinity can strongly influence its properties, such as density, diffusion, hardness, stiffness, melting point, tensile strength, and modulus. Extrinsically conductive nanocomposites have gained the attention of researchers because of their applications in electronic and electrical appliances such as sensors, electromagnetic interference shielding materials, capacitors, electrostatic discharge materials, etc. See S. Shang, et al., *Compos. Sci. Technol.* 69 (2009) 1156-1159 and M. Rahaman, et al., *Adv. Mater. Res.* 123, (2010) 447-450—each incorporated herein by reference in its entirety. Electrically conductive PVA nanocomposites with improved electromagnetic interference shielding (EMI) and mechanical strength have also been investigated. See J.-H. Lin, et al., *Macromol. Mater. Eng.* 301 (2016) 199-211 and K. Fujimori, et al., *J. Nanosci. Nanotechnol.* 13 (2013) 1759-64—each incorporated herein by reference in its entirety. Certain electronics generate electromagnetic pollution in the form of stray radiation. Electromagnetic interference shielding materials (EMI SE) are of great concern to prevent equipment from emitting this unwanted radiation into the surrounding environment. Usually, metals are candidates for EMI shielding due to the reflection of electromagnetic radiation from their electron-rich surface. However, problems related to metals such as high density, low flexibility, processing requirements, and corrosion make them less preferable as EMI shielding materials. Thus, the use of extrinsically conductive polymer nanocomposites have been gaining interest for EMI shielding due to their easy manufacturing, their light weight, their corrosion resistance, and their low cost. See S. Wen et al., *J. Mater. Sci.* 40 (2005) 3897-3903 and N. C. Das et al., *J. Mater. Sci.* 43 (2008) 1920-1925—each incorporated herein by reference in its entirety. Many studies have been done to investigate the electromagnetic interference shielding of different polymers with graphene. See N. Georgieva, et al., *Mater Lett* 88 (2012) 19-22 and J. Liang, et al., *Carbon* 47 (2009) 922-925—each incorporated herein by reference in its entirety. The EMI SE of a nanocomposite depends on the nanocomposite's aspect ratio, intrinsic conductivity, and dielectric constant of its filler. See M. B. Bryning, et al., *Adv. Mater.* 17 (2005) 1186-1191—incorporated herein by reference in its entirety.

Solution casting techniques have been widely used for polymer nanocomposite preparation. However, the strong interaction between graphene sheets makes them difficult to disperse homogeneously in a polymer matrix. The demanding objective in the development of the nanocomposite is to attain fully dispersed and effective interaction of the filler with the polymer matrix. Many studies have been conducted on the functionalization of the nano-filler, small chain insinuation, and peroxide addition during melt-mixing. See L. Feng, et al., *Nano Res.* 8 (2015) 887-899; D. Banerjee, et al., *Macromol. Res.* 20 (2012) 1021-1028; G. Wu et al., *Polym. Degrad. Stab.* 95 (2010) 1449-1455; and D. McIntosh, et al., *J. Phys. Chem. C* 111 (2007) 1592-1600—each incorporated herein by reference in its entirety.

Researchers are still trying to find out an environmentally friendly technique to acquire better interaction between the polymer matrix and the nano-filler. The irradiation of a polymer nanocomposite is considered as a useful technique to improve the structural, thermal, electrical, and mechanical properties by inducing crosslinking and/or degradation. The change in properties of a polymer under the effect of radiation depends on whether the polymer chains undergo crosslinking or chain-scission. Radiation can cause both cross-linking and chain-scission, depending on the radiation power, chemical structure, crystallite size, and the environment. See Miller A. A. *Ann N Y Acad Sci* 82 (1959) 774-781—incorporated herein by reference in its entirety. The degradation of PVA by irradiation has been studied by gamma rays. See S. Raghu, et al., *Radiat. Phys. Chem.* 98 (2014) 124-131; S. J. Zhang, et al., *Water Res.* 38 (2004) 309-316; and H. L. Chia, et al., *J. Polym. Sci. Part A Polym. Chem.* 34 (1996) 2087-2094—each incorporated herein by reference in its entirety. Microwave radiation has a strong and rapid penetration power with a significant effect on polar compounds and has been proven to be an economical, fast, and green technique for the preparation of polymer nanocomposites. Studies have scrutinized the role of microwave irradiation in graphene-polymer interaction. See M. Zubair, et al., *Surf Interface Anal.* 46 (2014) 630-639; M. Zubair, et al., *Thermochim. Acta* 633 (2016) 48-55; D. F. Stein, *Microwave Processing of Materials*, Committee on Microwave Processing of Materials, National Materials Advisory Board, 1994; M. A. Al-Harthi, *Polym. Compos.* 35 (2014) 2036-2042; M. Zubair, et al., *Compos. Interfaces* 22 (2015) 595-610; and T.K. B. S., et al., *Polymer* 55 (2014) 3614-3627—each incorporated herein by reference in its entirety.

In view of the foregoing, one objective of the present invention is to provide a method of making microwave irradiated PVA/graphene nanocomposites which show increased crystallinity, electrical conductivity, and electromagnetic interference shielding effectiveness as compared to non-irradiated samples. These PVA/graphene nanocomposites may be made using a solution casting technique, and may be characterized by FTIR, Raman spectroscopy, XRD, SEM, electrical conductivity, and electromagnetic shielding.

BRIEF SUMMARY OF THE INVENTION

According to a first aspect, the present disclosure relates to a method for producing a PVA/graphene nanocomposite. This method first involves dispersing poly(vinyl alcohol) and graphene nanoplatelets in water to form a mixture, where this mixture has a mass ratio of poly(vinyl alcohol) to graphene nanoplatelets of 50:1-200:1. The method involves drying the mixture to produce a film, and then exposing the film to a microwave radiation of 100-300 W for 3-20 minutes to form the PVA/graphene nanocomposite.

In one embodiment, the poly(vinyl alcohol) has a weight average molecular weight of 85-105 kDa.

In one embodiment, the graphene nanoplatelets have a thickness of 40-110 nm.

In one embodiment, the graphene nanoplatelets have a length to thickness aspect ratio of 40:1-1,200:1.

In one embodiment, the PVA/graphene nanocomposite has a bilayer structure with a PVA enriched layer and a graphene enriched layer.

In a further embodiment, the PVA enriched layer has a thickness of 135-400 μm, and the graphene enriched layer has a thickness of 4-10 μm.

In one embodiment, the method further involves a step of degassing the mixture before the drying.

In one embodiment, the drying is at 20–27° C. and 0.85-1.10 atm for 3-7 days.

In one embodiment, the mass ratio of poly(vinyl alcohol) to graphene nanoplatelets in the mixture is 80:1-110:1, and the film is exposed to the microwave radiation for 3-7 minutes.

In one embodiment, an electromagnetic interference shielding effectiveness of the PVA/graphene nanocomposite is 30-50 dB for an electromagnetic radiation in the range of 5.0-12.0 GHz.

In one embodiment, the exposing increases a graphene nucleation efficiency of the PVA/graphene nanocomposite to 500-570% from a graphene nucleation efficiency of 380-480% of the film.

In a further embodiment, the exposing increases a percentage crystallinity of the PVA/graphene nanocomposite to 51-60% from a percentage crystallinity of 40-50% of the film.

In a further embodiment, the exposing increases a Raman $I_D/I_G$ ratio of the PVA/graphene nanocomposite to 0.45-0.65 from an $I_D/I_G$ ratio of 0.25-0.40 of the film.

In a further embodiment, the PVA/graphene nanocomposite has a peak crystallization temperature of 202-206° C.

In a further embodiment, the PVA/graphene nanocomposite has a melting point of 227-231° C.

In one embodiment, the PVA/graphene nanocomposite has an electrical conductivity of 0.029-0.050 S/cm.

In one embodiment, the microwave radiation has a frequency in a range of 2200-2700 MHz.

In one embodiment, the mass ratio of poly(vinyl alcohol) to graphene nanoplatelets in the mixture is 80:1-110:1. The film is exposed to the microwave radiation for 12-20 minutes, and an electromagnetic interference shielding effectiveness of the PVA/graphene film is 70-80 dB for an electromagnetic radiation in the range of 8-12 GHz.

In one embodiment, the exposing comprises alternating on and off cycles, wherein each on cycle is 10-20 seconds long, and each off cycle is 45-90 seconds long.

According to a second aspect, the present disclosure relates to a method for producing a PVA/graphene film. This method involves the step of dispersing poly(vinyl alcohol) and graphene nanoplatelets in water to form a mixture, where the mixture has a mass ratio of poly(vinyl alcohol) to graphene nanoplatelets of 80:1-110:1. Then the mixture is dried to produce the PVA/graphene film, where the PVA/graphene film has a 90-140 dB electromagnetic interference shielding effectiveness for an electromagnetic radiation in the range of 0.8-2.5 GHz.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is an SEM image of the P sample.

FIG. 2B is an SEM image of the G1 sample, showing the polymer enriched side.

FIG. 2C is an SEM image of the G5 sample, showing the polymer enriched side.

FIG. 2D is an SEM image of the G10 sample, showing the polymer enriched side.

DETAILED DESCRIPTION OF THE EMBODIMENTS

Figure 1:
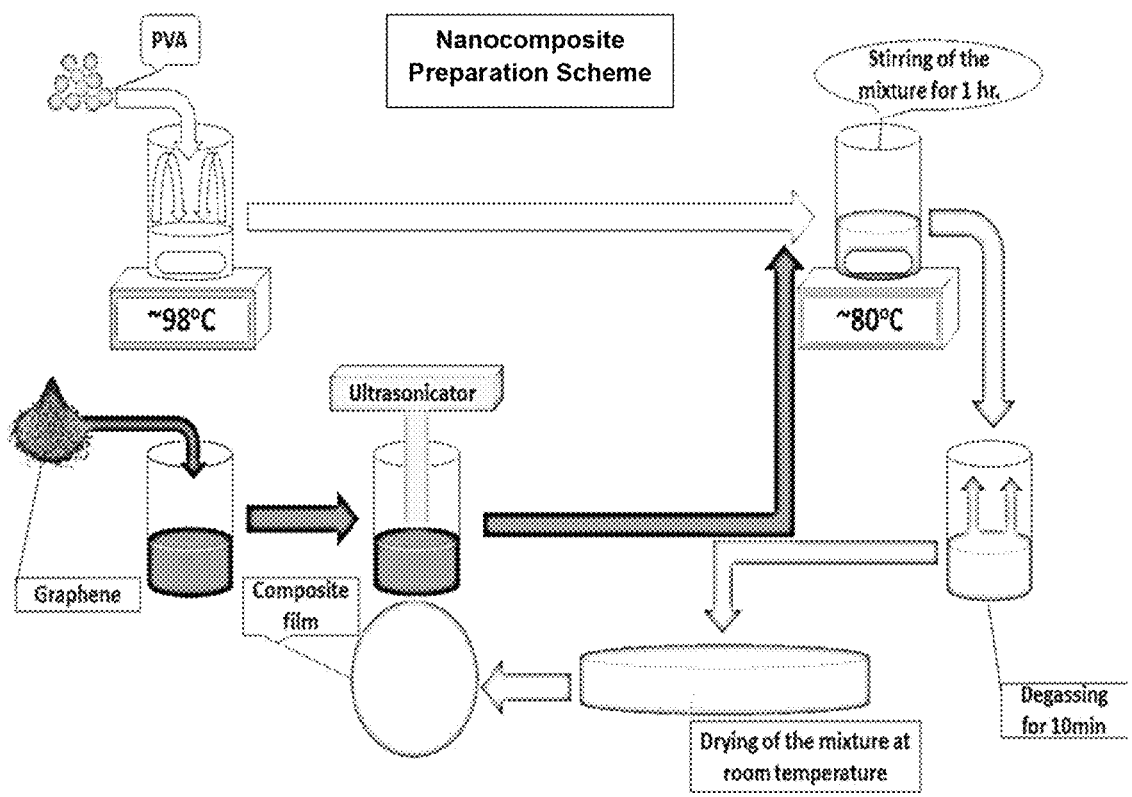
FIG. 1 is a diagram of the nanocomposite preparation, up to the step of forming a film.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

For polygonal shapes, the term "diameter," as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components.

In addition, the present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method for producing a PVA/graphene nanocomposite. This method first involves dispersing poly(vinyl alcohol) (PVA) and graphene nanoplatelets in water to form a mixture.

Poly(vinyl alcohol) (PVA, PVOH, or PVAl) is a water-soluble synthetic polymer. It has the idealized chemical formula $[CH_2CH(OH)]_n$. Poly(vinyl alcohol), like most polymers, is an electrical insulator. It is white (colorless) and odorless, exhibits crystallinity and can be supplied as beads or as solutions in water. PVA is biocompatible, non-toxic, resistant to oil, grease, and solvents and has a high tensile strength and flexibility. Additionally, PVA has excellent film forming, emulsifying, and adhesive properties.

Poly(vinyl alcohol) (PVA) has a relatively simple chemical structure with a pendant hydroxyl group. Unlike most vinyl polymers, PVA is not prepared by polymerization of the corresponding monomer. The monomer, vinyl alcohol, does not exist in a stable form, but rather rearranges to its tautomer, acetaldehyde. PVA instead is prepared by the polymerization of vinyl acetate to polyvinyl acetate (PVAc), followed by hydrolysis of PVAc to PVA. Other precursor polymers are sometimes used, with formate or chloroacetate groups instead of acetate. The conversion of the polyesters is usually conducted by base-catalyzed transesterification with ethanol. The hydrolysis reaction does not go to completion resulting in polymers with a certain degree of hydrolysis that depends on the extent of the reaction. In essence, PVA is always a copolymer of PVA and PVAc.

Poly(vinyl alcohol) is an atactic material, defined as a macromolecule where the substituents are placed randomly along the chain. The percentage of meso diads is between 1 and 99%. In terms of microstructure, it is composed mainly of 1,3-diol linkages [—$CH_2$—$CH(OH)$—$CH_2$—$CH$ (OH)—] but a few percent of 1,2 diols [—CH$_2$—CH(OH)—CH(OH)—CH$_2$-] occur, depending on the conditions for the polymerization of the vinyl ester precursor.

Several properties of the poly(vinyl alcohol) polymer depend on the amount of residual ester groups. The content of acetate groups, or degree of hydrolysis, has an effect on the chemical properties, solubility, and crystallizability of PVA. Residual hydrophobic acetate groups weaken the intra- and intermolecular hydrogen bonding of adjoining hydroxyl groups. Generally, PVA grades with high degrees of hydrolysis have a lower solubility in water and are more difficult to crystallize. In one embodiment, 0-10%, 10-20%, 20-30%, 30-40%, 40-50%, 50-60%, 60-70%, 70-80%, 80-90%, or 90-100% of the hydroxyl groups relative to a total number of hydroxyl groups in the poly(vinyl alcohol) are esterified. In another embodiment, 0.1-20%, preferably 0.5-10%, more preferably 0.7-8%, even more preferably 0.8-5% of the hydroxyl groups relative to a total number of hydroxyl groups in the poly(vinyl alcohol) are esterified.

In one embodiment, the poly(vinyl alcohol) has a weight average molecular weight of 85-105 kDa, preferably 87-102 kDa, more preferably 88-100 kDa, even more preferably 89-98 kDa. In another embodiment, the PVA may have a number average molecular weight within those values. However, in other embodiments, different molecular weights of PVA may be used, such as PVA having a weight average molecular weight or a number average molecular weight of 9-85 kDa, preferably 20-60 kDa, more preferably 25-45 kDa, though PVA having a weight average molecular weight or a number average molecular weight less than 9 kDa may also be used. Likewise, PVA having a weight average molecular weight or a number average molecular weight of greater than 105 kDa may be used, for instance, in the range of 105-220 kDa, preferably 120-200 kDa, more preferably 140-180 kDa. The PVA may be 100% hydrolyzed or at least 75 wt % hydrolyzed, preferably at least 85 wt % hydrolyzed, more preferably at least 95 wt % hydrolyzed, more preferably at least 99 wt % hydrolyzed, relative to a total weight of the PVA.

Dispersity is a measure of the heterogeneity of sizes of molecules or particles in a mixture. The polydispersity index (PDT or heterogeneity index) is a measure of the distribution of molecular mass in a given polymer sample. The PDI is calculated as the weight average molecular weight divided by the number average molecular weight. Typically, dispersities vary based on the mechanism of polymerization and may be affected by a variety of reaction conditions such as reactant ratios, or the extent of the polymerization reaction. Generally, a decreasing molecular weight distribution increases water solubility and increase flexibility. It can further affect properties of PVA including crystallizability, adhesion, mechanical strength, and diffusivity. In one embodiment, the poly(vinyl alcohol) of the present disclosure has a PDI of up to 6, preferably up to 5, preferably up to 3, preferably up to 2.5, preferably up to 2, preferably up to 1.5, preferably up to 1.25.

The degree of polymerization (DP) is defined as the number of monomeric units in a macromolecule or polymer. In one embodiment, the poly(vinyl alcohol) of the present disclosure has a degree of polymerization of 100-2500, preferably 100-1500, preferably 100-750, preferably 100-300.

General grades of poly(vinyl alcohol) include ultra-low viscosity (DP<300 and weight average molecular weight <23 kDa), low viscosity (DP=350-650 and weight average molecular weight=31-50 kDa), medium viscosity (DP=1000-1500 and weight average molecular weight=85-124 kDa) and high viscosity (DP=1600-2200 and weight average molecular weight=146-186 kDa). In the present disclosure, poly(vinyl alcohol) may refer to PVA that is ultra-low viscosity, low viscosity, medium viscosity, high viscosity or mixtures thereof.

It is envisioned that other polymeric materials may be used in lieu of poly(vinyl alcohol) as the polymer matrix of the PVA/graphene nanocomposite of the present disclosure. Although the selection of a polymer is not viewed as particularly limiting, the polarity of the polymer should be compatible with the graphene nanoplatelets. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, polystyrenes, high impact polystyrene, poly(vinyl pyridine), poly(methyl acrylate), polymethacrylates, poly(methyl methacrylate), polychloroprene, polyacrylamide, poly(N-isopropylacrylamide), poly(tetrafluoroethylene) (PTFE), poly(N-vinyl pyrolidone), poly(vinyl pyrrolidinone), poly(vinyl pyridine), polyethylenes, low-density poly(ethylene), high-density poly(ethylene), chlorinated polyethylene (CPD), poly(propylene), poly(isobutylene), poly(butylene), polyvinyl chlorides (PVC), polyvinyl chloride acetate, polyacrylonitriles, poly(ethyl acetate), poly(vinyl acetate), polyvinylacetates, polyvinyl acetate phthalate, ethylene vinyl acetates, poly(ethylene glycol), polyphenylene ethers, poly(ethylene vinyl alcohol), poly(vinylidene fluoride), poly(p-phenylenevinylene), poly(benzoxazole), polyphenylenebenzobisoxazole (PBO), polyaryletherketones, poly(ether ether ketones), polyphenylenesulfides, polyamide imides, polyarylates, polyarylsulphones, poly(styrene-co-acrylonitrile), ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polystyrene-polyisoprene diblock copolymers, polyamides, poly(ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), polysiloxanes, fluorosilicones, fluoropolymers, polybutadienes, butadiene copolymers, epoxidized natural rubbers, epoxy polymer resins, poly (cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly(ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, styrene butadiene rubbers, bismaleimides, copolymer rubbers, styrene-isoprene-styrenes, styrene-butadiene-styrenes, ethylene-propylene, ethylene-propylene-diene monomers (EPDM), nitrile-butadienes, acrylonitrile butadiene styrene (ABS), polyethylene/acrylonitrile butadiene styrene, polycarbonate/acrylonitrile butadiene styrene, nylons, thermoplastic continuous and discontinuous fiber composites, thermosetting continuous and discontinuous fiber composites, specialty polymers, and blends, mixtures, alloys, and copolymers thereof.

In an alternative embodiment, other polymers may be used in addition to or in place of PVA. For instance, a PVA co-polymer may be used, such as poly(vinyl alcohol-co-ethylene) ethylene. Alternatively, other polymers that do not contain PVA or vinyl alcohol units may be used, such as poly(lactic-co-glycolic acid), polycaprolactone, polyacrylamide, or cellulose. In another embodiment, an intrinsically conducting polymer may be used in addition to or in place of PVA. Intrinsically conducting polymers (ICPs) are organic polymers that conduct electricity. Examples of intrinsically conducting polymers include, but are not limited to, poly(fluorene)s, polyphenylenes, polypyrenes, polyazulenes, polynaphthalenes, poly(acetylene)s (PAC), Poly(p-phenylene vinylene) (PPV), poly(pyrrole)s (PPY), polycarbazoles, polyindoles, polyazepines, polyanilines (PANT), poly(thiophene)s (PT), poly(3,4-ethylenedioxythiophene) (PEDOT), poly(p-phenylene sulfide) (PPS) and copolymers and mixtures thereof.

In one embodiment, poly(vinyl alcohol) copolymers may be used, including, but not limited to, poly(vinyl alcohol-co-ethylene) ethylene, poly(acrylic acid)-co-poly(vinyl alcohol) copolymer, poly(vinyl butyral)-co-poly(vinyl alcohol copolymer, poly(vinyl acetate)-co-poly(vinyl alcohol) copolymer, poly(vinyl chloride)-co-poly(vinyl alcohol), and mixtures thereof.

In one embodiment, the polymer matrix is envisioned to be comprised of poly(vinyl alcohol) doped with additives including, but no limited to, crosslinkers, defoamers, dispersants, biocides, and plasticizers.

The graphene nanoplatelets comprise graphene. Graphene is an allotrope of carbon in the form of a two-dimensional, atomic-scale hexagonal lattice in which one atom forms each vertex. Graphene is approximately 200 times stronger than steel by weight and conducts heat and electricity with great efficiency. It is the basic structural element of other allotropes including graphite, charcoal, carbon nanotubes, and fullerenes. Carbon nanotubes are formed by rolling up a graphene sheet into a tubular structure, and graphite is formed by stacking multiple graphene sheets. Graphene or other allotropes of carbon may be synthesized and formed into a variety of morphologies and shapes including, but not limited to, nanoparticles, nanosheets, nanoplatelets, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof.

Structurally, graphene is a crystalline allotrope of carbon with 2-dimensional properties. As used herein, graphene is a sheet of six-membered carbon rings that do not form a closed surface. Its carbon atoms are densely packed in a regular atomic-scale "chicken wire" (hexagonal) pattern. Each atom has four bonds, one σ-bond with each of its three neighbors, and one π-bond that is oriented out of the plane. Graphene's hexagonal lattice can be regarded as two interleaving triangular lattices.

Graphene's stability is due to its tightly packed carbon atoms and each carbon atom in a graphene sheet having an $sp^2$ orbital hybridization and delocalized electrons present at opposite surfaces of the graphene sheet. The $sp^2$ hybridization is a combination of orbitals S, $P_x$, and $P_y$ that constitute the σ-bond, and the final $P_z$ electron makes up the π-bond. The π-bonds hybridize together to form the π-band and the π*-band. These bands are responsible for most of graphene's notable electronic properties, via the half-filled band that permits free-moving electrons. Graphene is a zero-gap semiconductor. Graphene is also the only form of carbon (or solid material) in which every atom is available for chemical reaction from two sides (due to the 2D structure).

In one embodiment, the graphene nanoplatelets have a thickness of 40-110 nm, preferably 45-105 nm, more preferably 50-100 nm, and diameters of 5-45 preferably 10-40 μM, more preferably 15-35 μm. In one embodiment, the graphene nanoplatelets have a length to thickness aspect ratio of 40:1-1,200:1, preferably 50:1-1,000:1, more preferably 70:1-900:1. Graphene nanoplatelets having dimensions as discussed above may also be referred to as sheets, nanosheets, nanoflakes, nanoparticles, or platelets. In an alternative embodiment, a different carbonaceous nanomaterial may be used in place of the graphene nanoplatelets, such as carbon black (e.g., furnace black and Ketjen black), active carbon, carbon nanorods, carbon nanotubes, carbon fibers, graphene, graphite, expandable graphite, graphene oxide, exfoliated graphite nanoplatelets, thermally reduced graphene oxide, chemically reduced graphene oxide, and mixtures thereof.

The graphene nanoplatelets may comprise less than 15 mol % carbon, preferably less than 5 mol % carbon, more preferably less than 3 mol % carbon involved in a structural or chemical defect, including, but not limited to isotopic impurities, substitutional impurities, vacancies, and interstitial impurities.

In one embodiment, the graphene comprising the graphene nanoplatelets of the present disclosure has an oxygen content of less than 5%, preferably less than 4%, preferably less than 3%, preferably less than 2%, preferably less than 1%. In one embodiment, the graphene comprising the graphene nanoplatelets of the present disclosure has a C/O ratio of at least 10, preferably at least 20, preferably at least 30, preferably at least 40, preferably at least 50, preferably at least 75, preferably at least 100, preferably at least 150, preferably at least 200.

In one embodiment, the graphene comprising the graphene nanoplatelets of the present disclosure may be chemically modified; graphene is commonly modified with nitrogen and oxygen containing functional groups (e.g. graphene oxide). Exposed carbon on the edges of nanosheets or nanoplatelets often reacts with the atmosphere to form hydroxyls, carboxyls, lactones, pyrones, alcohols, carbonyls, imines, and/or amines. These modifications may be covalent, non-covalent, or mixtures thereof. Examples of functional groups on graphene include, but are not limited to, alcoholic, carboxylic, aldehydic, ketonic, and esteric oxygenated functional groups. Alternatively, the graphene may be chemically modified with amine or imine functionality. Chemical functionalization of the graphene may aid the manufacturing of the graphene polymer nanocomposite or improve the interface between the graphene nanoplatelets and the PVA.

In one embodiment, the graphene comprising the graphene nanoplatelets of the present invention may be chemically modified such that it has a ClO ratio of less than 10, preferably less than 5, preferably less than 4, preferably less than 3, preferably less than 2.

In one embodiment, the graphene may be prepared from exfoliation of graphite. As used herein, "exfoliation" refers to cleavage or coming apart of a material that is shed from a surface as scales or layers. The exfoliation may be by mechanical cleavage means such as adhesive tape, shearing, or wedge-based mechanical exfoliation. The exfoliation may also be by direct sonication cleavage such as solvent-aided sonication, solvent/surfactant aided sonication, and immiscible liquid-aided sonication. In one embodiment, the graphene may be prepared from graphite oxide or graphene oxide via thermal (~2000° C./s) or chemical (hydrazine) reduction followed by or preceded by exfoliation.

As mentioned earlier, the present disclosure relates to a method for producing a PVA/graphene nanocomposite which first involves dispersing poly(vinyl alcohol) (PVA) and graphene nanoplatelets in water to form a mixture. A mass ratio of poly(vinyl alcohol) to graphene nanoplatelets in the mixture may be 50:1-200:1, preferably 65:1-160:1, more preferably 80:1-110:1, even more preferably 90:1-105:1, or about 100:1. Water may be present in the mixture at a weight percentage of 90-98 wt %, preferably 91-97 wt %, more preferably 93-96.5 wt %, relative to a total weight of the mixture.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deinonized distilled, or reverse osmosis water and at 25° C. has a conductivity at less than 10 $\mu S \cdot cm^{-1}$, preferably less than 1 $\mu S \cdot cm^{-1}$, a resistivity greater than 0.1 M$\Omega$·cm, preferably greater than 1 M$\Omega$·cm, more preferably greater than 10 M$\Omega$·cm, a total solid concentration less than 5 mg/L, preferably less than 1 mg/L, and a total organic carbon concentration less than 1000 μg/L, preferably less than 200 μg/L, more preferably less than 50 μg/L.

In another embodiment, a solvent other than water may be used in the mixture to disperse the PVA and graphene nanoplatelets. This solvent may be a polar protic solvent, an aprotic polar solvent, or a non-polar solvent. Suitable polar protic solvents may include, but are not limited to, nitromethane, and short chain alcohols such as methanol, ethanol, propanol, isopropanol, butanol, other short chain alcohols of the like, and mixtures thereof. Suitable aprotic polar solvents may include, but are not limited to, propylene carbonate, ethylene carbonate, butyrolactone, acetonitrile, benzonitrile, nitromethane, nitrobenzene, sulfolane, dimethylformamide, N-methylpyrrolidone, other solvents of the like, and mixtures thereof. Suitable non-polar solvents may include, but are not limited to, cyclohexane, octane, heptane, hexane, benzene, toluene, xylene, methylene chloride, carbon tetrachloride, diethyl ether or the like and mixtures thereof. In one embodiment, co-solvents may also be used.

The PVA and graphene nanoplatelets may be dispersed in the mixture by mechanical mixing, magnetic agitation, mild sonication, high-energy ultrasonication, shear mixing, refluxing, shaking, and combinations thereof. Preferably the PVA and graphene nanoplatelets are dispersed by 10-20 min, preferably 12-17 min of high-energy ultrasonication at a power of 100-300 W, preferably 150-250 W using a probe-tip ultrasonicator. In another embodiment, a bath sonicator may be used. In one embodiment, the dispersion of graphene nanoplatelets may occur by adding graphene nanoplatelets directly to a solution of PVA; in another embodiment, the graphene nanoplatelets are dispersed in water and then mixed with a solution of PVA. In another embodiment, graphene nanoplatelets and PVA may be added simultaneously to water and then dispersed, or the graphene nanoplatelets may be added and dispersed before adding the PVA. The mixture of dispersed PVA and graphene nanoplatelets may be further mixed at an elevated temperature of 40-95° C., preferably 60-90° C., more preferably 70-85° C., or about 80° C. This further mixing may use any of the previously mentioned modes of mixing and may be carried out for 5 min-24 h, preferably 20 min-12 h, more preferably 45 min-1.25 h.

In one embodiment, the method further involves a step of degassing the mixture before the drying. The degassing may be carried out by placing a container of the mixture into a bath sonicator. A sonication cycle that uses intermittent sonication pulses may be applied, where during a pulse, gas bubbles may nucleate from dissolved gases in the mixture, and between pulses, those gas bubbles may float to and release at the surface. Alternatively, the degassing may be done by placing the mixture in a vessel having a reduced pressure, such as a vacuum chamber. The reduced pressure decreases the solubility of the dissolved gas, which form bubbles and release at the surface. A mixture under reduced pressure may be stirred or agitated at a slow speed to increase the rate of gas bubble evolution and escape. Degassing may be performed by other methods, such as gentle heating. In one embodiment, the dispersing of the PVA and graphene nanoplatelets in water to form a mixture may be carried out in a way that also degasses the mixture, and thus a separate degassing step may not be necessary. The mixture may be degassed for 5-30 min, preferably 7-20 min, more preferably 8-12 min. In another embodiment, an inert gas may be bubbled through the mixture to replace other dissolved gases with the inert gas.

The method next involves drying the mixture to produce a film. The mixture is poured on a flat level surface, a fine mesh, or coated on the interior walls of a vessel, such as a round bottom flask of a rotating evaporator. In other embodiments, the mixture may be spin coated onto a flat surface. Pouring the mixture onto a surface and drying may be considered a solution casting method. In another embodiment, the mixture may be dried in its container without transferring or pouring the mixture to a different container or surface. In one embodiment, the mixture may be poured into plastic petri dishes, or some other shallow, flexible dish. The mixture may be poured to a thickness of 1-20 mm, preferably 3-10 mm, more preferably 4-9 mm. In one embodiment, any container may be used that has a smooth surface on which to dry the mixture, and that has dimensions to allow for those thicknesses of a poured mixture.

In one embodiment, the drying is at 20–27° C., preferably 22-26.5° C., more preferably 24-26° C., or at some temperature commonly known as "room temperature." The drying may also be performed at temperatures lower than 20° C. or greater than 27° C. The drying may be done at a pressure of 0.85-1.10 atm, preferably 0.9-1.05 atm, more preferably about 1 atm, or at ambient air pressure. In other embodiments, the drying may be done in a chamber under a vacuum or otherwise a low pressure, for example, a pressure less than 0.85 atm, preferably less than 0.5 atm, more preferably less than 0.1 atm. The drying may be done for 3-7 days, preferably 4-6.8 days, more preferably 5-6.5 days, or about 6 days. However, in certain conditions the drying may be done for less than 3 days, less than 1 day, or 3-12 hours. Preferably the relative humidity is 50% or less, preferably 30% or less, more preferably 20% or less, though in other embodiments, the mixture may be placed in a desiccator, vacuum chamber, or near a source of dry gas (such as near a dehumidifier or under a gentle flow of an inert gas) having lower relative humidities. In one embodiment, the drying is done by leaving the mixture unperturbed in a normal indoor environment. In an alternative embodiment, the mixture may be freeze-dried or lyophilized. In one embodiment, the drying may be carried out intentionally slowly (for example, drying over the course of 6 days in a humid environment) so that the mixture forms a bilayer, preferably with a graphene enriched layer on top. In another embodiment, the drying may be carried out quickly (for example, within hours) so that the film forms with a homogeneous dispersion of graphene nanoplatelets throughout. In another embodiment, the drying may be performed for an intermediate time, so that a film is formed having an increasing concentration gradient of graphene nanoplatelets towards the top of the film. In alternative embodiments, the graphene nanoplatelets and/or PVA may be modified so that a PVA enriched layer forms on top. In another alternative embodiment, a dispersion of PVA in water may be poured, and then before or after the PVA dispersion dries, a dispersion of graphene nanoplatelets may be poured onto the PVA dispersion. The drying of both layers may lead to a PVA/graphene nanocomposite having a bilayer with interaction between the two layers. In one embodiment, the dried film may then be peeled from the surface it was poured onto and kept in a desiccator or vacuum chamber to avoid moisture uptake.

Next, the film is exposed to a microwave radiation of 100-300 W, preferably 150-250 W, more preferably 180-120 W for 3-20 minutes to form the PVA/graphene nanocomposite. In one embodiment, the exposure time may be 3-7 min, preferably 3.5-6 min, more preferably 4-5.5 min, though in another embodiment the exposure time may be 12-20 min, preferably 13-18 min, more preferably 14-16 min. In one embodiment, the microwave radiation has a frequency in a range of 2200-2700 MHz, preferably 2300-2600 MHz, more preferably 2400-2500 MHz. In other embodiments, microwave frequencies lower than 2200 MHz or higher than 2700 MHz may be used. The microwave radiation may come from a source such as a domestic, industrial, or commercial microwave oven, or from a different source of microwave radiation, such as a transmitter directing microwave radiation through a horn antenna, dish antenna, or waveguide. In one embodiment, the film may be cooled by air cooling to prevent overheating of the film by the microwave radiation. In one embodiment, where the film forms with a graphene enriched layer and a PVA enriched layer, the graphene enriched layer faces the microwave radiation source during the exposing. In another embodiment, the film may be placed in an oven or reflection chamber that scatters the radiation for more even absorption by the film on both sides.

In one embodiment, the exposing comprises alternating on and off cycles, wherein each on cycle is 10-20 seconds long, preferably 12-18 seconds long, more preferably 13-17 seconds long, and each off cycle is 45-90 seconds long, preferably 50-75 seconds long, more preferably 55-65 seconds long. Here, the "on cycle" means that the microwave radiation is applied to the film, while the "off cycle" means that no microwave radiation is applied. Preferably the off cycle involves the microwave transmitter switching off so that it emits no radiation, though in other embodiments, the microwave radiation may be blocked, or reflected to a different direction while the transmitter continues to emit. In one embodiment, these alternating on and off cycles prevent the film from overheating, and may be combined with other methods of cooling. In another embodiment, rather than alternating cycles on and off, the radiation power may be reduced with an equivalent increase in the exposing time to expose the film to the same amount of total energy. In another embodiment, the radiation power may be instead increased with an equivalent decrease in the exposing time.

In one embodiment, the PVA/graphene nanocomposite has a bilayer structure with a PVA enriched layer and a graphene enriched layer. The PVA enriched layer may have a thickness of 135-400 µm, preferably 140-350 µm, more preferably 145-300 µm, and the graphene enriched layer may have a thickness of 4-10 µm, preferably 4.5-9 µm, more preferably 5-8 µm. The PVA enriched layer may comprise 0.01-10 wt % graphene nanoplatelets, preferably 0.1-5 wt % graphene nanoplatelets, more preferably 0.2-1 wt % graphene nanoplatelets relative to a total weight of the PVA enriched layer, with the remaining weight percentage being from PVA. Similarly, the graphene enriched layer may comprise 0.1-20 wt % PVA, preferably 0.5-10 wt % PVA, more preferably 0.7-5 wt % PVA relative to a total weight of the graphene enriched layer, with the remaining weight percentage being from graphene nanoplatelets.

In one embodiment, each layer may be considered a nanocomposite. A nanocomposite is a multiphase solid material where one of the phases (here, graphene nanoplatelets or PVA) has one, two, or three dimensions of less than 100 nm, or the nanocomposite comprises structures with nanoscale repeat distances between the different phases that make up the material. In general, the mechanical, electrical, thermal, optical, electrochemical, and/or catalytic properties of a nanocomposite will differ from that of its component materials.

In one embodiment, the graphene nanoplatelets may be considered as a nano-filler. Nano-fillers may comprise particles, sheets, and/or fibers of different shapes and sizes with at least one dimension of 100 nm or smaller. Appropriately adding a nano-filler to a polymer matrix can enhance its performance by capitalizing on the nanoscale nature and properties of the nano-filler. This strategy is particularly effective in yielding high performance composites when the properties of the nano-filler are substantially different or better than those of the matrix. Nanoscale dispersion of nano-filler into a composite can introduce new physical properties and novel behaviors that are absent in the unfilled matrices, effectively changing the nature of the original matrix. These new physical properties and novel behaviors result from the high surface area to volume ratio of the nano-filler phase and/or its high aspect ratio, which allows a greater interaction area of interface between the nano-filler and the matrix as compared to a composite comprising a non-nanoscale filler.

Graphene nanoplatelets in the graphene enriched layer may be in the form of stacked or multilayer graphene layers, where a stacked graphene layer may have a thickness of 2-200 atoms, 5-100 atoms, or 8-30 atoms.

Graphene nanoplatelets may be stacked in the AB stacking pattern, or Bernal-stacked form, where half of the atoms lie directly over the center of a hexagon in the lower graphene sheet, and half of the atoms lie over an atom. The graphene nanoplatelets may also be stacked in the AA stacking pattern, in which the graphene layers are exactly aligned. The graphene nanoplatelets may also have a twisted configuration.

In one embodiment, the graphene nanoplatelets of the present disclosure may have wrinkled and/or rippled morphologies. The height of these wrinkles or ripples from the basal plane of the graphene nanoplatelets may range from less than 0.25 nm to about 5 nm, preferably from 0.3-2.5 nm, preferably from 0.5-2 nm, preferably from 1-1.5 nm. The number and frequency of these wrinkles or ripples may vary depending on the chemical size and structure of the nanoplatelet. In another embodiment, the nanoplatelets may be substantially corrugated, leading to substantially increased surface area relative to non-corrugated nanoplatelets of comparable size.

In one embodiment, the graphene nanoplatelets of the present disclosure may form sandwich structures such as a sandwich of graphene-PVA-graphene or PVA-graphene- PVA, and so on to more complex multilayer structures with repeating layers of graphene and PVA.

In one embodiment, the inter-planar distance of the graphene is less than 10 Å, preferably less than 7.5 Å, preferably less than 5 Å, preferably less than 4 Å, preferably less than 3 Å, preferably less than 2.5 Å, preferably less than 2 Å, preferably less than 1.5 Å, preferably less than 1 Å.

In another embodiment, the PVA enriched layer may be substantially free of graphene, meaning that the PVA enriched layer has less than 0.01 wt % graphene, preferably less than 0.001 wt % graphene relative to a total weight of the PVA enriched layer. The graphene enriched layer may be substantially free of PVA, meaning that the graphene enriched layer has less than 0.01 wt % PVA, preferably less than 0.001 wt % PVA relative to a total weight of the graphene enriched layer.

In one embodiment, one or both PVA enriched layer and graphene enriched layer may have a concentration gradient of PVA or graphene nanoplatelets. For example, a PVA enriched layer may comprise 0.01-0.05 wt % graphene in a region adjacent to one side of the layer, and may comprise 0.1-0.5 wt % graphene in another region adjacent to an opposing side. Likewise, a graphene enriched layer may comprise 0.1-0.5 wt % graphene in a region adjacent to one side of the layer, and may comprise 2-10 wt % graphene in another region adjacent to an opposing side.

In another embodiment, a PVA/graphene nanocomposite formed as a single layer without a bilayer structure may have a concentration gradient of graphene nanoplatelets or PVA as described above, but with greater weight percentages. This single layer may have a thickness of 100-420 μm, preferably 140-400 μm, preferably 160-350 μm.

In one embodiment, it is envisioned that the present invention may be adapted to incorporate nanoscale metals instead of or in addition to graphene nanoplatelets. Examples of possible metals include, but are not limited to, silver, gold, copper, nickel, iron, aluminum zinc, palladium, platinum, magnesium, zirconium, titanium, vanadium, rhodium, rhenium, uranium, silicon, molybdenum, thorium, chromium, manganese, cerium, germanium, tantalum, lead, cadmium, calcium, antimony, tin, bismuth, cobalt, tungsten, indium, brass, bronze, white brass, stainless steel, and alloys or mixtures thereof.

In one embodiment, it is envisioned that the present invention may be adapted to incorporate nanoscale metal oxides instead of or in addition to graphene nanoplatelets. Examples of possible metal oxides include, but are not limited to oxides of iron, copper, zinc, magnesium, vanadium, nickel, rhodium, rhenium, molybdenum, thorium, chromium, manganese, cerium, silver, lead, cadmium, calcium, antimony, tin, bismuth, cobalt, tungsten, titanium dioxide (anatase, rutile), alumina ($Al_2O_3$), antimony-tin-oxide (ATO), silica (diatomite, pyrogenic silica, silica fume), ruthenium dioxide ($RuO_2$), bismuth ruthenate ($Bi_2Ru_2O_7$), bismuth iridate ($Bi_2Ir_2O_7$), indium oxide ($In_2O_3$), lanthanum chromite ($LaCr_2O_4$), zirconia ($ZrO_2$), titania, iron oxide, silica-alumina, mica, ferrite, and mixtures thereof.

In another embodiment, inorganic nanomaterials such as boehmite may be used instead of or in addition to graphene nanoplatelets. Boehmite is a mineral aluminum oxide hydroxide (γ-AlO(OH)) having a orthorhombic dipyramidal crystal structure. It can be obtained naturally or by chemical synthesis from saturated solutions. In another embodiment, metal carbonates may be used instead of or in addition to graphene nanoplatelets. These metal carbonates include, but are not limited to magnesium carbonate, potassium carbonate, sodium carbonate, barium carbonate, calcium carbonate, and mixtures thereof.

In one embodiment, it is envisioned that the present invention may be adapted to incorporate natural or synthetic nanoscale clays or phosphates of transition metals instead of or in addition to graphene nanoplatelets. The nanoscale clays are classified according to their crystalline structures and also to the quantity and position of the ions within their simplest atomic geometric pattern. The most widely used nanoscale clays are phyllosilicates (smectites) having a shell-shaped crystalline structure with nanometer thickness but also include polysilicates and layered double hydroxides. Examples of possible nanoclays include, but are not limited to, montmorillonite (MMT), kaolinite, smectite (talc, mica, MMT), sepiolite, chlorite, saponite, bentonite, kenyaite, magadiite, kanemite, ilerite, silhydrite, zeolite, fluorohectorite, hydrotalcite, and mixtures thereof.

In one embodiment, it is envisioned that the present invention may be adapted to include nanoscale ceramics instead of or in addition to graphene nanoplatelets. Representative examples of ceramics include carbides such as silicon carbide (SiC), chromium carbide ($Cr_3C_2$), titanium carbide (TiC), zirconium carbide (ZrC), boron carbide ($B_4C$), and diamond (C), nitrides such as silicon nitrides (SiN, $Si_3N_4$), boron nitride (BN), zirconium nitride (ZrN), niobium nitride (NbN), and titanium nitride (TiN), borides such as titanium boride (TiB), zirconium boride (ZrB), tantalum boride (TaB), vanadium boride ($VB_2$), and lanthanum boride ($LaB_6$), and silicides such as titanium silicide (TiSi), tantalum silicide (TaSi), molybdenum silicide (MoSi), and tungsten silicide ($WSi_2$).

In one embodiment, it is envisioned that the present invention may be adapted to include nanoscale electroceramics instead of or in addition to graphene nanoplatelets. Representative examples of electroceramics include zirconium barium titanate, strontium titanate (ST), calcium titanate (CT), magnesium titanate (MT), calcium magnesium titanate (CMT), zinc titanate (ZT), lanthanum titanate (TLT), lithium lanthanum titanate (LLT), neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), layered silicates, magnesium aluminum silicate, magnesium silicate, barium tantalite, titanium dioxide, niobium oxide, sapphire, beryllium oxide, barium titanate, zirconia, silica, zirconium tin titanate and mixtures thereof.

In one embodiment, it is envisioned that the present invention may be adapted to include nanoscale silsesquioxanes instead of or in addition to graphene nanoplatelets. A silsesquioxane is an organosilicon compound with the empirical formula $RSiO_{312}$ where R is hydrogen, or an alkyl, alkene, aryl, arylene, or some other organo-functional group. Silsesquioxanes can have a cage-like structure, most commonly in the form of a cube, hexagonal prism, octagonal prism, decagonal prism, dodecagonal prism, or open cage-like structure. The three-dimensional symmetry and nanometer size make silsequioxanes building blocks for nanocomposites. The diversity of possible functional groups along with their controlled orientation in three-dimensional space allows for highly tailored nanometer-by-nanometer construction in all three dimensions. Examples of possible silsesquioxanes include, but are not limited to, polyhedral oligosilsesquioxanes (POSS), octasilsesquioxanes of the $[ROSiO_{1.5}]_8$ type and its polymeric derivatives, and the $[R-phenylSiO_{1.5}]_8$ type and its polymeric derivatives.

Preferably, a synergistic effect exists between the PVA enriched layer and the graphene enriched layer that would not otherwise exist if a separately formed PVA enriched layer of the same dimensions and chemical composition was placed in contact with a separately formed graphene enriched layer of the same dimensions and chemical composition. Preferably this synergistic effect leads to increased crystallinity, increased nucleation efficiency, and increased electromagnetic interference shielding effectiveness. The synergistic effect may be a result of the bilayer interface having a hydrogen bonding interaction between an oxygenated group in graphene and the —OH group in PVA, or the bilayer interface having a mixed structure of both graphene nanoplatelets and PVA. These effects may create fibrous structures that are visible in SEM.

In one embodiment, a PVA/graphene nanocomposite formed with a bilayer of a PVA enriched layer and a graphene enriched layer may have the PVA enriched layer forming an electrical insulator and the graphene enriched layer forming an electrical conductor. Here, an electrical insulator refers to a solid material with a high electrical resistivity that may prevent an electric current from flowing between two points. The electrical resistivity of the insulator may be at least $10^2 \Omega \cdot m$, preferably at least $10^3 \Omega \cdot m$, more preferably at least $10^4 \Omega \cdot m$ at 20° C. An electrical conductor is a substance with an electrical resistivity of at most $10^{-6} \Omega \cdot m$, preferably at most $10^{-7} \Omega \cdot m$, more preferably at most $10^{-8} \Omega \cdot m$ at 20° C. In this embodiment, the electrical conductivity measurement of the PVA/graphene nanocomposite may depend on the topology of the nanocomposite.

In an alternative embodiment, the PVA/graphene nanocomposite may be formed without a bilayer structure and with an even concentration of PVA and graphene nanoplatelets dispersed throughout.

In one embodiment, the mass ratio of poly(vinyl alcohol) to graphene nanoplatelets in the mixture is 80:1-110:1, preferably 85:1-105:1, more preferably 95:1-102:1, or about 100:1 and the film is exposed to the microwave radiation for 3-7 min, preferably 3.5-6 min, more preferably 4-5.5 min. Here, an electromagnetic interference shielding effectiveness of the PVA/graphene nanocomposite may be 30-50 dB, preferably 33-48 dB, more preferably 35-45 dB, for an electromagnetic radiation in the range of 5.0-12.0 GHz, preferably 7.0-11.5 GHz, more preferably 8.0-10.0 GHz. The electromagnetic interference shielding effectiveness (EMI SE) of the PVA/graphene nanocomposite may be measured with a vector network analyzer.

In a further embodiment, the PVA/graphene nanocomposite has a peak crystallization temperature of 202-206° C., preferably 203-205° C., more preferably 203.5-204.5° C. The peak crystallization temperature is the temperature in which a cooling, amorphous solid begins to crystallize.

In a further embodiment, the exposing for 3-7 min, preferably 3.5-6 min, more preferably 4-5.5 min increases a graphene nucleation efficiency of the PVA/graphene nanocomposite to 500-570%, preferably 520-560%, more preferably 540-555% from a graphene nucleation efficiency of the film of 380-480%, preferably 390-460%, more preferably 410-440%. The nucleation efficiency is a measure of how much a nucleating agent (in this case, graphene) increases the peak crystallization temperature relative to the maximum possible increase of the peak crystallization temperature. The overall high effectiveness may be attributed to the high aspect ratio of graphene as compared to pure PVA crystals. Here, the increase in nucleation efficiency from the microwave radiation exposure may be due to the microwave radiation increasing the dispersion of the graphene nanoplatelets. In one embodiment, a PVA/graphene nanocomposite having the same mass ratio but an exposing time of greater than 7 minutes may have a lower nucleation efficiency, for example, a nucleation efficiency of 100-250%, preferably 120-200%, more preferably 130-160%. This decrease in nucleation efficiency may be due to the increased microwave irradiation causing degradation of the nanocomposite.

In a further embodiment, the exposing for 3-7 min, preferably 3.5-6 min, more preferably 4-5.5 min increases a percentage crystallinity of the PVA/graphene nanocomposite to 51-60%, preferably 52-58%, more preferably 54-56% from a percentage crystallinity of 40-50%, preferably 42-49%, more preferably 44-48% of the film. The crystallinity may be calculated by differential scanning calorimetry (DSC), and the increase in percentage crystallinity may result from the recrystallization of molecular chains under the effect of radiation. In another embodiment, the radiation exposure may produce short length PVA chains by chain-scission and defects in graphene. This may increase the interaction between the PVA chains and graphene, and result in increased crystallinity. In one embodiment, a PVA/graphene nanocomposite having the same mass ratio but an exposing time of greater than 7 minutes may have a lower percentage crystallinity, for example, a percentage crystallinity of 45-51%, preferably 46-50%, more preferably 47-49%. This lower percentage crystallinity may be due to the increased microwave irradiation creating crosslinking and degradation within the PVA/graphene nanocomposite.

In a further embodiment, the exposing for 3-7 min, preferably 3.5-6 min, more preferably 4-5.5 min increases a Raman $I_D/I_G$ ratio of the PVA/graphene nanocomposite to 0.45-0.65, preferably 0.50-0.60, more preferably 0.53-0.57 from an $I_D/I_G$ ratio of 0.25-0.40, preferably 0.26-0.36, more preferably 0.28-0.32 of the film. Here, $I_D$ is the value of the Raman D-band intensity at 1357 cm$^{-1}$, which corresponds to the level of defects present in graphene's structure. $I_G$ is the value of the Raman G-band intensity at 1583 cm$^{-1}$, which is associated with the $E_{2g}$ phonon at the center of the Brillouin zone. The increase in the $I_D/I_G$ ratio upon microwave radiation may result from the crystalline structure of the graphene being transformed to a nanocrystalline structure, or may be a result of the increase in percentage crystallinity as previously described. In one embodiment, a PVA/graphene nanocomposite having the same mass ratio but an exposing time of greater than 7 minutes may have a lower Raman $I_D/I_G$ ratio, for example, an $I_D/I_G$ ratio of 0.20-0.45, preferably 0.22-0.40, more preferably 0.24-0.35. This lower $I_D/I_G$ ratio may be due to the nanocrystalline structure of the graphene being converted into an amorphous phase by the longer irradiation times.

In a further embodiment, the PVA/graphene nanocomposite, formed from a film being exposed for 3-7 min, preferably 3.5-6 min, more preferably 4-5.5 min, has a melting point of 227-231° C., preferably 228-230° C., more preferably 228.5-229.5° C. In one embodiment, a PVA/graphene nanocomposite having the same mass ratio but an exposing time of greater than 7 minutes may have a lower melting point, for example, 220-227° C., preferably 221-226° C., more preferably 222-225° C. This decrease in the melting point may be due to the decreased percentage crystallinity, as mentioned previously.

In one embodiment, the PVA/graphene nanocomposite has an electrical conductivity of 0.029-0.050 S/cm, preferably 0.030-0.045 S/cm, more preferably 0.032-0.040 S/cm. In this embodiment, the PVA/graphene nanocomposite may be formed from a film exposed to 7-20 min, preferably 8-17 min, more preferably 9-16 minutes of microwave radiation at the previously mentioned frequencies and power. Preferably the electrical conductivity is a measure of the direct current (DC) conductivity, is greater than the electrical conductivity of a PVA film containing no graphene, and is greater than a PVA/graphene nanocomposite formed from a film exposed to less than 7 min microwave radiation, for example, 5 min microwave radiation.

In another embodiment, where the mass ratio of poly(vinyl alcohol) to graphene nanoplatelets in the mixture is 80:1-110:1, preferably 85:1-105:1, more preferably 95:1-102:1, or about 100:1, the film is exposed to the microwave radiation for 12-20 min, preferably 13-18 min, more preferably 14-16 min. Here, an electromagnetic interference shielding effectiveness of the PVA/graphene nanocomposite may be 70-80 dB, preferably 72-79 dB, more preferably 74-78 dB, for an electromagnetic radiation in the range of 8-12 GHz, preferably 10.0-11.5 GHz, more preferably 10.5-11.2 GHz.

According to a second aspect, the present disclosure relates to a method for producing a PVA/graphene film. This method involves the step of dispersing poly(vinyl alcohol) and graphene nanoplatelets in water to form a mixture as previously described. The mixture may have a mass ratio of poly(vinyl alcohol) to graphene nanoplatelets of 80:1-110:1, preferably 85:1-105:1, more preferably 95:1-102:1, or about 100:1. Then the mixture is dried as previously mentioned to produce the PVA/graphene nanocomposite. The steps in making the PVA/graphene film may be similar to the steps for making the PVA/graphene film, without the step of exposing the film to microwave radiation. For instance, the mixture may be ultrasonicated and/or degassed as previously described. Here, the PVA/graphene film has an electromagnetic interference shielding effectiveness of 90-140 dB, preferably of 95-135 dB, more preferably of 100-130 dB for an electromagnetic radiation in the range of 0.8-2.5 GHz, preferably 1.0-2.0 GHz, more preferably 1.2-1.7 GHz.

In one embodiment, an electrical or electronic device may be covered by the PVA/graphene nanocomposite by attaching the nanocomposite to the device by any reasonable manner. The PVA/graphene nanocomposite may be attached through surface coating interaction (e.g. glued, tacked, cemented, pasted, etc.), attached by highly connected or integral interactions (e.g. melted together, fused, amalgamated, etc.), or sandwiched between a plurality of electronic components of the device. In another embodiment, the electrical or electronic device is covered by the PVA/graphene nanocomposite by first applying the PVA and graphene mixture to the device and then forming the PVA/graphene nanocomposite on the device by drying and exposure to microwave radiation. In another embodiment, the electrical device is covered by, attached to, wrapped, or enclosed by a metal or alloy or ceramic substrate on which the PVA/graphene nanocomposite is disposed.

In one embodiment, the PVA/graphene nanocomposite may be transparent and find use as a transparent conductive film in photovoltaic cells, liquid crystal displays and touch panel devices. In another embodiment, the unique non-uniform electrical storage characteristics of the nanocomposite film of the present disclosure may find use in supercapacitors, Li—$O_2$ batteries, or Li-ion batteries.

In one embodiment, the PVA/graphene nanocomposite of the present disclosure is envisioned to find use as an antistatic agent or electrostatic discharge material. An antistatic agent is a compound used to reduce or eliminate the buildup of static electricity on surfaces. The role of the antistatic agent is to make the surface of the material itself slightly conductive. Antistatic devices reduce static electricity that can damage electrical components, cause bodily injury, or ignite flammable liquids and gases.

Exemplary non-limiting applications of the PVA/graphene nanocomposite as an antistatic agent or component of an antistatic device include, but are not limited to, antistatic bags used to contain devices, such as graphics cards or hard disk drives, often during transport, antistatic garments such as gloves or shoes used in many industries such as electronics, communications, telecommunications, and defense applications, antistatic mats, antistatic straps, and antistatic bars used to ground many sensitive processes and systems.

In one embodiment, the PVA/graphene nanocomposite is envisioned to find use as an electromagnetic shielding material. Electromagnetic (EM) shielding is the practice of reducing the electromagnetic field in a space by blocking the field with barriers made of conductive materials. Shielding is typically applied to enclosures for isolating electronic devices from the "outside world" and applied to cables to isolate wires from the environment through which the cable runs. The PVA/graphene nanocomposite of the present disclosure may completely enclose an electronic product or a portion of that product and prevent the EM emission from an outside source from deteriorating its electronic performance. Conversely, it may also be used to prevent an external susceptible (electronic items or living organisms) from internal emissions of an instrument's electronic circuitry. In one embodiment, the PVA/graphene nanocomposite of the present invention may be applied to plastics comprising sensitive electronic devices.

Exemplary non-limiting applications of the PVA/graphene nanocomposite as an electromagnetic shielding material include, but are not limited to, an EM shielding gasket, a shielded cable, protection of medical, laboratory and defense equipment from interfering signals including AM, FM, TV, emergency services, dispatch, pagers, cellular, ESMR and PCS, protection for computers and keyboards to prevent passive monitoring, and protection of secure data stored on RFID chips embedded in many devices. The PVA/graphene film may be substituted for any of the above uses of the PVA/graphene nanocomposite.

The examples below are intended to further illustrate protocols for preparing, characterizing the PVA/graphene nanocomposite and the PVA/graphene film, and uses thereof, and are not intended to limit the scope of the claims.

Example 1

Experimental Procedures
Materials

Poly(vinyl alcohol), 99% hydrolyzed ($M_r$ =89,000-98,000 g/mole) was purchased from Sigma-Aldrich Chemicals, USA. Graphene with 96-99% purity (size=50-100 nm) was procured from Grafen Chemical Industries Co., Turkey. Materials were used for nanocomposite film preparation as received without any modification.

Preparation of Nanocomposite

PVA/graphene films were prepared using a solution casting technique as shown in FIG. 1. First, 3 g of polymer was dissolved in 50 mL deionized water at 98° C. using a magnetic stirrer (600 rpm). Then a certain amount of graphene (based on formulation ratio) was added into 25 mL deionized water. A stable dispersion of graphene was achieved in water with ultra-sonication for 15 min at 30% amplitude using a QSonica model Q700. After that, the dispersed graphene was added to the PVA solution. Stirring of the mixture was continued for 1 hour at 80° C. Then the mixture was degassed under vacuum for 10 minutes to remove the air bubbles from the solution. Finally, the mixture was poured into a plastic petri dish. The petri dish was placed on a levelled flat surface and allowed to dry at room temperature for six days. The dried nanocomposite films were carefully peeled off from the plastic petri-dish. The films were kept in a desiccator to avoid moisture uptake. Different nanocomposite films were prepared in the same manner with different graphene amounts. Table 1 provides the details of the prepared samples.

TABLE 1

Composition of PVA Nanocomposites and irradiation time.

| Sample Code | PVA (wt %) | Graphene (wt %) | Irradiation Time (min) | Water (mL) |
|---|---|---|---|---|
| P | 100 (3)[a] | 0 (0)[b] | 0 | 75 |
| P(5 M) | 100 (3)[a] | 0 (0)[b] | 5 | 75 |
| P(10 M) | 100 (3)[a] | 0 (0)[b] | 10 | 75 |
| P(15 M) | 100 (3)[a] | 0 (0)[b] | 15 | 75 |
| G1 | 100 (3)[a] | 1 (0.03)[b] | 0 | 50 + 25 |
| G1(5 M) | 100 (3)[a] | 1 (0.03)[b] | 5 | 50 + 25 |
| G1(10 M) | 100 (3)[a] | 1 (0.03)[b] | 10 | 50 + 25 |
| G1(15 M) | 100 (3)[a] | 1 (0.03)[b] | 15 | 50 + 25 |
| G5 | 100 (3)[a] | 5 (0.15)[b] | 0 | 50 + 25 |
| G10 | 100 (3)[a] | 10 (0.3)[b] | 0 | 50 + 25 |

[a,b]Values in parentheses represent the weight in grams.

Microwave Irradiation

Prepared samples were exposed to microwave radiation. Radiation exposure was done using a domestic microwave oven in the presence of air at a 200 watt constant power and frequency of 2450 MHz. Sample G1 (size=30×20×6 mm) was subjected to cyclic irradiation of 15 seconds by keeping graphene side towards the radiation source. After 15 seconds the sample was taken out from the oven to cool at room temperature for 60 seconds to eliminate the effect of heat on PVA/graphene nanocomposite. However, Sample P (size=30×20×6 mm) was subjected to cyclic irradiation of 60 seconds. After 60 seconds of irradiation, Sample P was taken out from the oven to cool at room temperature for 120 seconds to eliminate the effect of heat on PVA. The samples were irradiated for durations of 5, 10, or 15 min. Only P and G1 samples could be irradiated through the aforementioned procedure. G5 and G10 were subjected to irradiation but due to the high concentration of graphene in the samples, the samples ignited after 5 seconds of irradiation. Therefore, characterization of irradiated G5 and G10 samples could not proceed.

Example 2

Characterization
Scanning Electron Microscope (SEM)

The scanning electron micrographs were collected from a Tescan, MIRA 3 LMU FTIR. Prior to analysis, surfaces of the samples were coated with a 5 nm thick gold layer using sputter coating under vacuum.

Fourier Transform Infrared (FTIR)

The functional groups of both the original and radiated samples were studied with a Nicolet 6700 Fourier Transform Infrared (FTIR). The spectra were recorded in the frequency range of 400-4000 $cm^{-1}$.

Raman Spectroscopy

Raman spectra of the samples were obtained by a Horiba Jobin Yvon Raman spectrometer (iHR320) with a CCD detector. The spectra were taken in the range of 100-3000 $cm^{-1}$ with a resolution of 532 nm. The exposure time was 30 s and the laser intensity was 60%.

X-Ray Diffraction (XRD)

XRD spectra of the samples were taken with a Bruker D8-Advance X-ray diffractometer using CuKα radiation with a wavelength of 1.5414 Å. To detect any change in crystal structure, the angle of diffraction (2Θ) was varied from 5° to 60°. The XRD spectra were taken with a scanning rate of 2°/min operating at 30 kV and 30 mA.

Differential Scanning Calorimetry (DSC)

A DSC-Q1000 of TA Instrument was used for measuring percentage crystallinity. DSC was carried out under a 50 mL/min flow of nitrogen. The DSC machine was calibrated through indium melting characteristics. About 4-6 mg sample was taken for each individual DSC run. A heat-cool-heat cycle was employed at constant heating and cooling rate of 10° C./min. Each sample was heated from room temperature to 250° C. and kept isothermal for 3 min at 250° C. to minimize the effect of thermal history. After that sample was cooled to 30° C. and again heated up to 250° C. Data of the second heating cycle was used for analysis. To ensure reproducibility, all experiments were conducted three times. The percentage crystallinity was calculated using the below equation 1, where the enthalpy of melting for 100% crystalline PVA is 161 J $g^{-1}$. See F. Shehzad, et al., *J. Therm. Anal. Calorim.* 123 (2016) 1501-1511 and R. L. Blaine, *THERMAL APPLICATIONS NOTE: Polymer Heats of Fusion* TA Instruments, New Castle Del.—each incorporated herein by reference in its entirety.

$$x = \int_T^{T\infty} \frac{\left(\frac{dH}{dT}\right)dT}{161} \times 100 \tag{1}$$

DC Conductivity

DC conductivities of the composite films were measured using a Keithley 2400 source meter. The samples were prepared as rectangles 2 cm long and 1 cm wide. A two point method was adopted for measurement. The DC conductivity of each sample was calculated by measuring the electrical resistance and using equation 2:

$$\alpha = \frac{L}{R \cdot A} \tag{2}$$

Where α, R, L, and A represent the conductivity, resistance, length, and cross sectional area of the sample, respectively.

Electromagnetic Interference Shielding Effectiveness (EMI SE)

The EMI SE of the un-irradiated and irradiated samples was measured in the X-Band 8-12 GHz using a two port Hewlett Packard (HP) 8510C vector network analyzer. Standard wave guide transmission line and rectangular holder were utilized to take both forward and backward scattering (S) parameters. A 85054D Agilent Technologies calibration kit was employed prior to EMI SE measurement in order to eliminate any disturbance created by the transmission lines and the rectangular holders. The EMI SE is calculated from the measured S-parameter based on equation 3. See S. P. Pawar, et al., *Phys. Chem. Chem. Phys.* 17 (2015) 14922-14930—incorporated herein by reference in its entirety.

$$SE_T(dB) = 10\log \cdot \frac{1}{|S_{21}|^2} = 10\log \cdot \frac{1}{|S_{12}|^2} \qquad (3)$$

Example 3

Results and Discussion

SEM

Figure 2E:
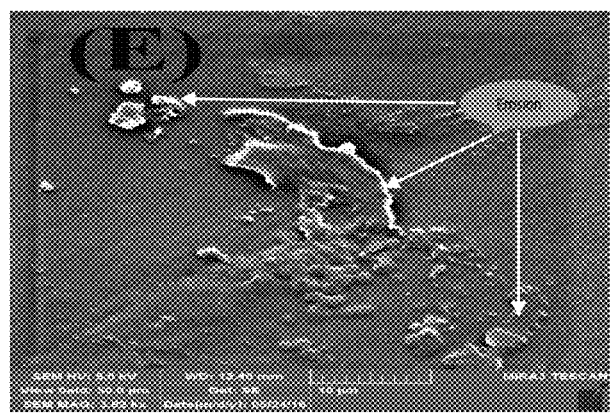
FIG. 2E is an SEM image of the P (5M) sample.
Figure 2F:
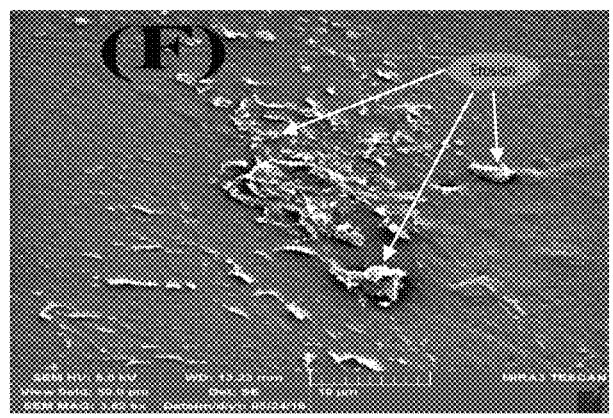
FIG. 2F is an SEM image of the P (10M) sample.
Figure 2G:
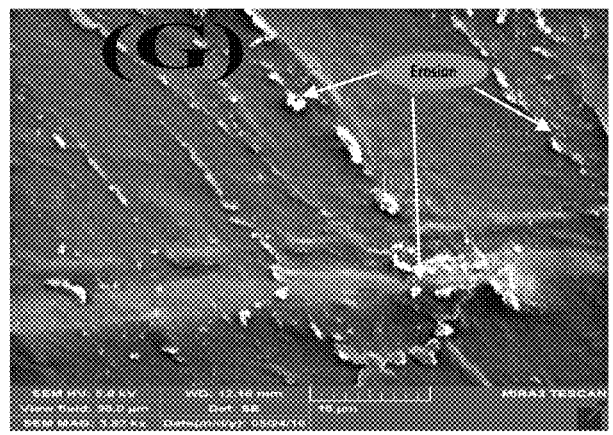
FIG. 2G is an SEM image of the P (15M) sample.
Figure 2H:
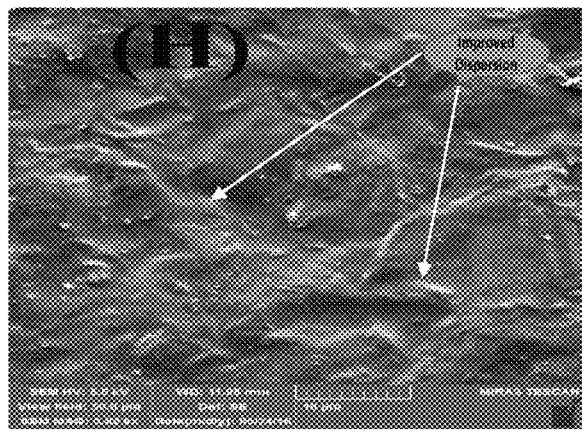
FIG. 2H is an SEM image of the G1 (5M) sample, showing the polymer enriched side.
Figure 2I:
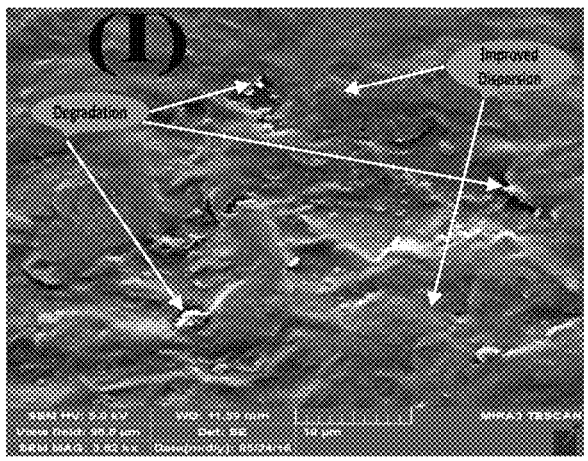
FIG. 2I is an SEM image of the G1 (10M) sample, showing the polymer enriched side.
Figure 2J:
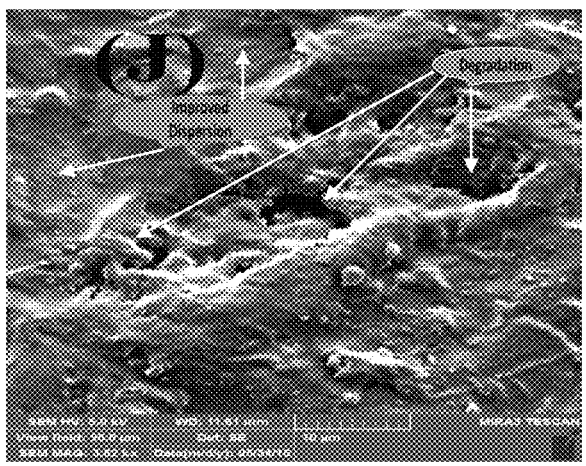
FIG. 2J is an SEM image of the G1 (15M) sample, showing the polymer enriched side.
Figure 2K:
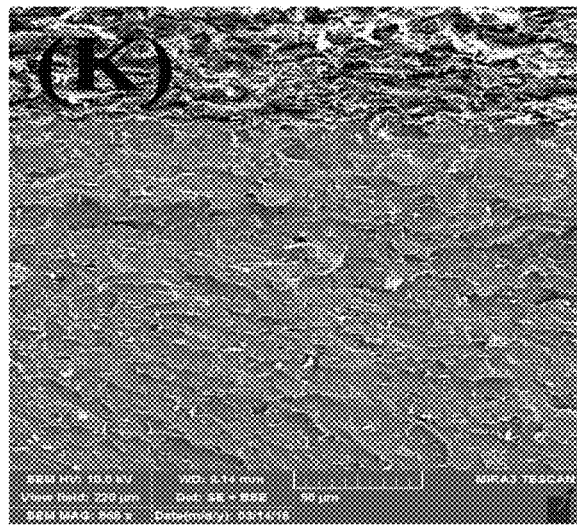
FIG. 2K is an SEM image showing a cross-section of the G10 sample.
Figure 2L:
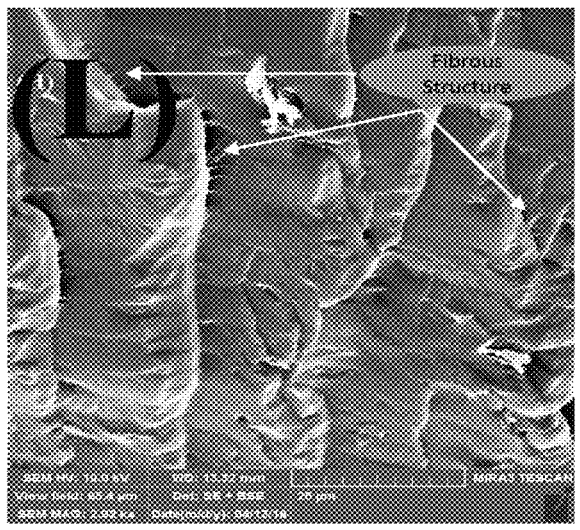
FIG. 2L is an SEM image showing a cross-section of the G1 (10M) sample.

SEM images for the surfaces of the PVA and PVA/graphene nanocomposites before and after irradiation are shown in FIGS. 2A-2D and FIGS. 2E-2J, respectively. SEM images for the cross-section of G10 and G1 (10M) are shown in FIGS. 2K and 2L, respectively. From FIGS. 2A-2D it can be seen that with the incorporation of graphene in the PVA matrix, the smooth surface of PVA changed to rough and discrete patterns. This may be attributed to graphene enrichment in the PVA chain which becomes more prominent with higher concentrations of graphene. Moreover, due to graphene enriched structures at higher percentages, the electromagnetic interference shielding and DC electrical conductivity of the samples increase (as confirmed in below sections). SEM images of irradiated samples were taken at a lower voltage and with a higher magnification to avoid deterioration and to show degradation respectively. FIGS. 2E-2G clearly demonstrate that after 5 min of irradiation, the smooth surface of PVA showed some erosion. This erosion is due to development of cross-linking in P (5M) followed by the degradation in P (10M) and P (15M).

In addition, in the case of nanocomposite, the rough and discrete patterns of un-irradiated G1 (FIG. 2B) changed to a very smooth and continuous surface after 5 min of irradiation. This change is associated in two ways. The first way is both the formation of defects in graphene's structure (as confirmed from Raman analysis) and chain scission of PVA chains. The second way is the improvement in dispersion of graphene (as confirmed from XRD) within the PVA matrix. These changes lead to increases in graphene polymer interaction and ultimately affect the crystallinity, nucleation efficiency, EMI SE, and DC electrical conductivity as discussed below. However, further irradiation (10 and 15 min) degrades the sample, which causes an increase in rupture of the G1 (10M) and G1 (15M) surfaces (FIGS. 2I-2J). This degradation leads to a decrease in percentage crystallinity and nucleation efficiency of graphene. Despite the decrease in percentage crystallinity and nucleation efficiency due to longer irradiation, there is a comprehensive improvement in EMI SE and DC electrical conductivity. By increasing the irradiation time, the dispersion of graphene further increased and created a more distributed framework which ultimately affected the electrical properties. From FIG. 2K, it can be seen that after the incorporation of graphene, a bi-layer structure has developed. Furthermore, FIG. 2L shows the cross-section view of the G1 (10M) sample and clearly indicates the development of fibrous structures due to cross-linking. Nonetheless, these morphological changes produce interesting alterations in electrical properties of the composite.

FTIR Analysis

Figure 3A:
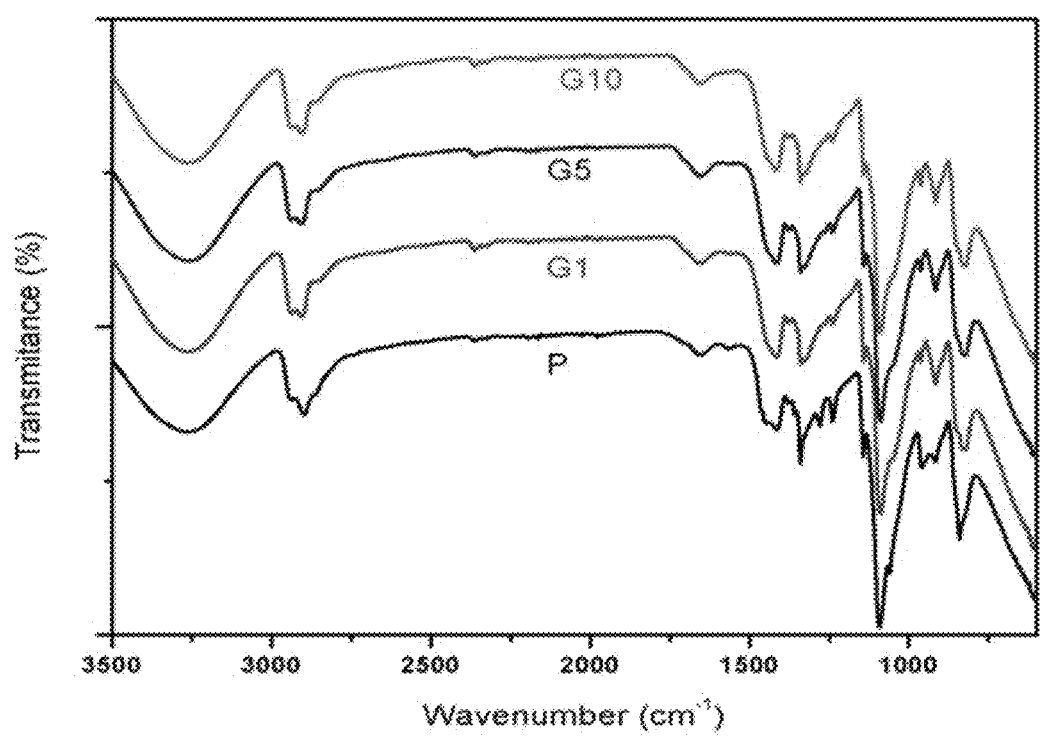
FIG. 3A shows FTIR spectra of PVA and non-irradiated PVA/graphene samples.
Figure 3B:
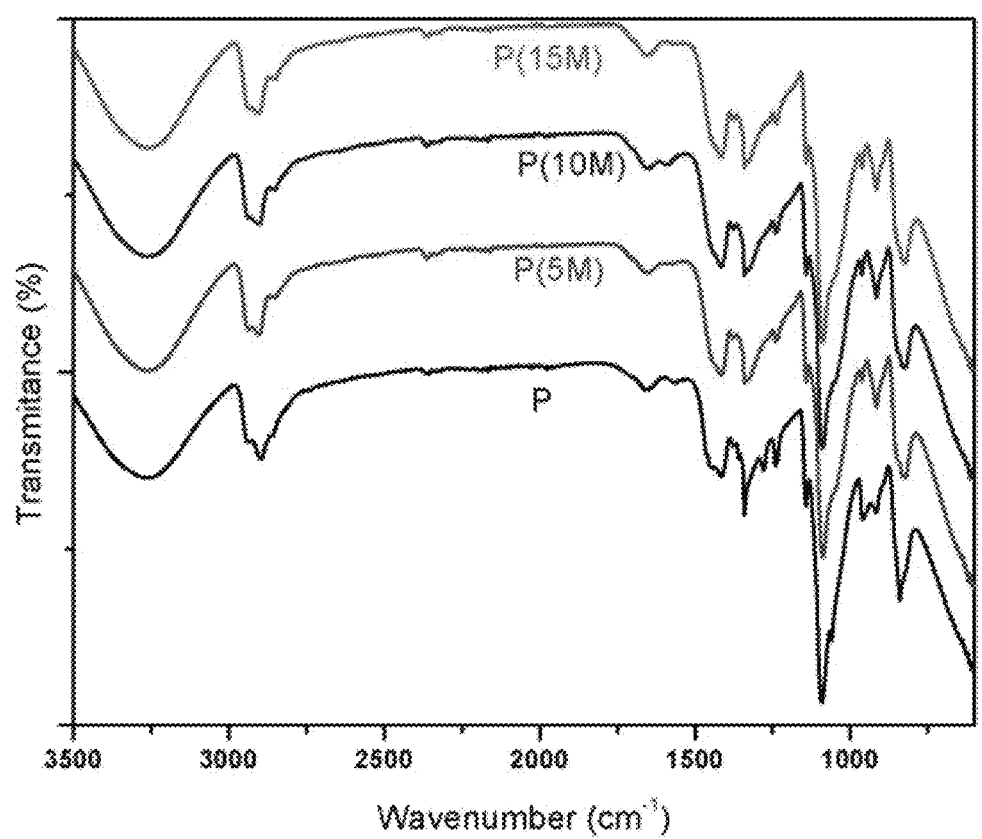
FIG. 3B shows FTIR spectra of PVA and irradiated PVA samples.
Figure 3C:
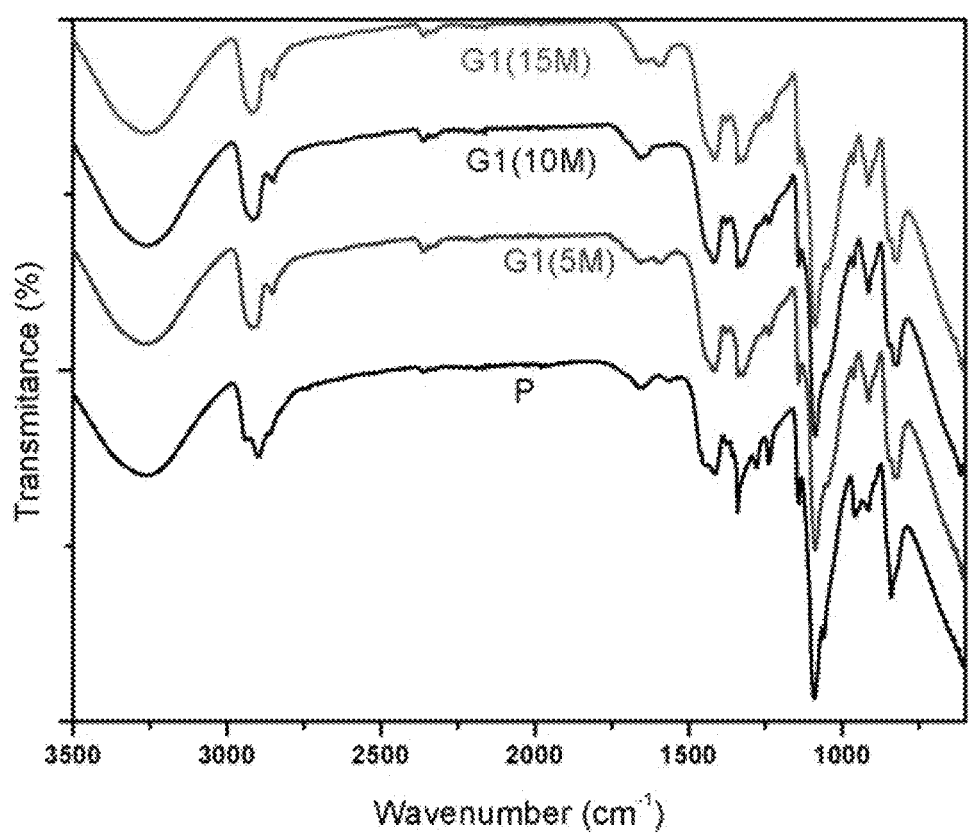
FIG. 3C shows FTIR spectra of PVA and irradiated PVA/graphene nanocomposites.

FIG. 3A represents the spectra of pure PVA and PVA/graphene un-irradiated samples. FIG. 3B represents the spectra of un-irradiated and irradiated PVA samples, while FIG. 3C represents the spectra of un-irradiated PVA and irradiated nanocomposites. A characteristic broad peak across 3200-3500 $cm^{-1}$ corresponds to the stretching vibrations of the hydroxyl group (—OH) of PVA and nanocomposites. See N. Ahad, et al., *J. Nanomater.* 2012 (2012), Article ID 857569—incorporated herein by reference in its entirety. The peak around 2814-2970 $cm^{-1}$ represents the alkyl (C—H) stretching. The carboxylic group (C=O) stretching vibrational peak around 1743 $cm^{-1}$ is due to graphene while the hump at 1712 $cm^{-1}$ results from the C=O group in PVA. Hydroxyl group (—OH) in-plane blending and C—H wagging in pure PVA is shown by the band of 1487-1230 $cm^{-1}$, while stretching vibrations of the nanocomposite's —OH group are at 1384 $cm^{-1}$. Epoxy (C—O—C) stretching at 1240 $cm^{-1}$ is due to graphene (fuller-enol) while the vinyl group (C=C) stretching from 1140-955 $cm^{-1}$ is due to pure PVA. The stretching vibration of C—O from 973-870 $cm^{-1}$ and the out of plane vibration of C—C at 840 $cm^{-1}$ also results from pure PVA. It can be seen that the intensity of the absorption spectra from 3200-3500 $cm^{-1}$ from the —OH group of pure PVA decreases with the increase in graphene percentage (FIG. 3A). This is because of H-bonding interaction between the oxygenated group in graphene and —OH of PVA at the cost of already existing intermolecular and intramolecular H-bonding. This phenomenon is usually referred to as the hydrogen bond barrier. See S. Mahendia, et al., *J. Mol. Struct.* 1111 (2016) 46-54, and J. Jose, et al., *J. Appl. Polym. Sci.,* 132 (2015) 1-8—each incorporated herein by reference in its entirety. A decrease in the intensity and shifting was also observed against C—H and C=O bands because of scissoring mode. These results confirm interaction between the polymer (PVA) and filler (graphene). See N. V. Medhekar, et al., *ACS Nano,* 4 (2010) 2300-2306 and J. Liang, et al., *Adv. Funct. Mater.* 19 (2009) 2297-2302—each incorporated herein by reference in its entirety. PVA mobility is affected due to these H-bonding interactions, which can be observed by the changes in the transition behavior (glass transition temperature $T_g$). It can be seen clearly from FIG. 3B that after 5 min of irradiation, the intensities of vinyl (C=C) and carboxylic (C=O) groups increase due to side chain scission, which may facilitate the formation of a cross-linking structure. Similar changes have been observed for irradiated nanocomposites as compared to a neat polymer sample as shown in FIG. 3C. See N. M. El-Sawy, et al., *Polym. Plast. Technol. Eng,* 49 (2010) 169-177—incorporated herein by reference in its entirety. The higher irradiation (10 and 15 mins) showed some overlapping between the bands of C—H (aliphatic), HC=O (aldehyde), and —OH (hydroxyl) 3500-2970 $cm^{-1}$. Moreover, in the 10 min and 15 min irradiated samples, the carbonyl group peak intensity decreased, compared to the 5 min irradiated sample, along with overlapping which is due to the backbone rupture of the polymer trunk. The aforementioned argument is in accordance with SEM analysis. FTIR results are in agreement with previously reported results. The PVA undergoes rupture and structure arrangement due to gamma-irradiation as per the following scheme (4). See S. J. Zhang, et al., *Water Res.* 38 (2004) 309-316; A. M. A. Ghaffar; L. Gongxu, et al., *Radiat. Phys. Chem.* 42 (1993) 229-232; and N. V. Bhat, et al., *Nucl. Instruments Methods Phys. Res. Sect. B Beam Interact. with Mater. Atoms* 237 (2005) 585-592—each incorporated herein by reference in its entirety.

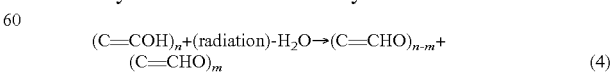

$$(C=COH)_n + (radiation)-H_2O \rightarrow (C=CHO)_{n-m} + (C=CHO)_m \qquad (4)$$

Raman Spectroscopy

Figure 4A:
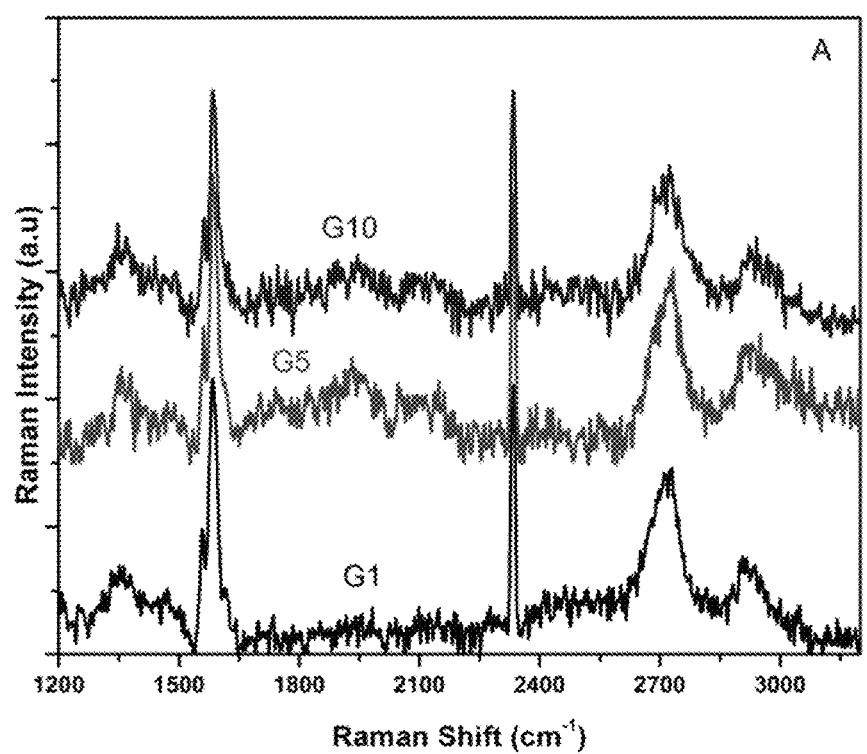
FIG. 4A shows Raman spectra of non-irradiated PVA/graphene samples.
Figure 4B:
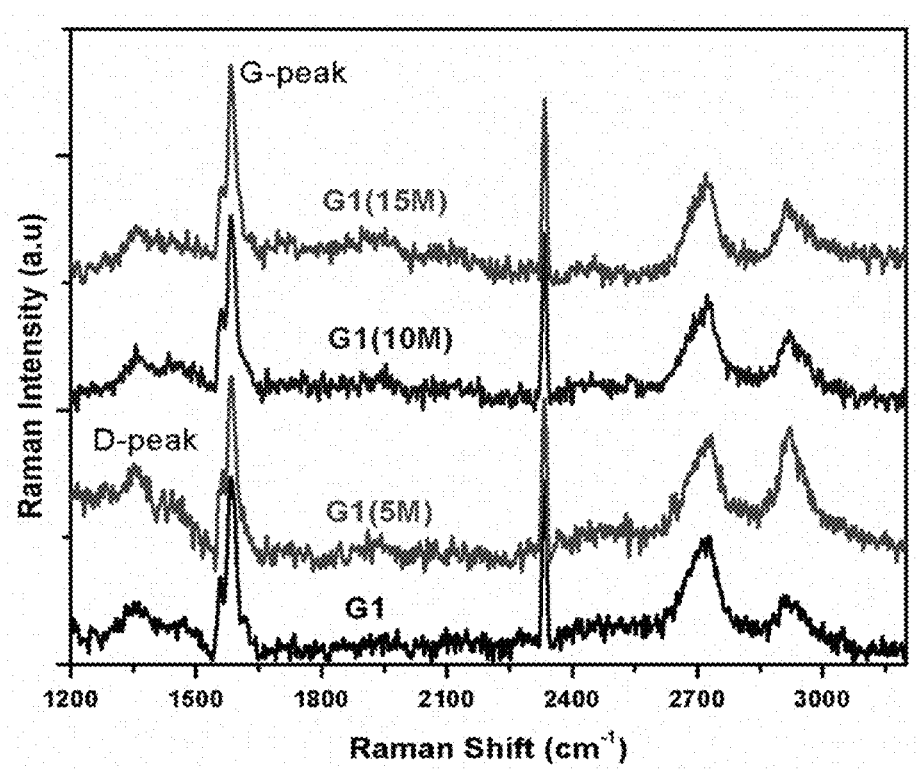
FIG. 4B shows Raman spectra of PVA/graphene nanocomposites.

FIGS. 4A and 4B display the Raman spectra of un-irradiated and irradiated nanocomposites. D-band, G-band, and 2D band are the three important characteristic peaks of Raman spectra. The D-band corresponds to the out-of-plane breathing mode of sp² atoms and indicates the level of defects present in graphene structure. See A. C. Ferrari et al., *Phys. Rev. B*, 64 (2001) 75414—incorporated herein by reference in its entirety. The G-band is associated with the $E_{2g}$ phonon at the center of Brillouin zone. See M. S. Dresselhaus, et al., *Carbon N.Y.*, 33 (1995) 883-891—incorporated herein by reference in its entirety. As shown in Table 2, the intensity of the D-band increases with the increase of graphene content in PVA-graphene nanocomposites. This indicates that the formation of defects in graphene structure may facilitate the improvement in the interaction of graphene with the polymer chains via covalent bonding. See S. Stankovich, et al., *Carbon N.Y.* 45 (2007) 1558-1565—incorporated herein by reference in its entirety.

In the case of irradiated nanocomposites, after 5 min of microwave irradiation (FIG. 4B), a significant increase in the intensity of the D-band was observed. The D-band intensity increased from 69.17 to 126.70 after 5 min of irradiation of G1. This is associated with the formation of defects in the graphene structure by irradiation. In addition, the $I_D/I_G$ was also increased from 0.31 to 0.55 after 5 min of irradiation (Table 2). The increase in $I_D/I_G$ is described by Ferrari and Robertson's hypothesis that the crystalline structure of graphene transforms to a nano crystalline structure. The structural changes in graphene induced by irradiation leads to an improvement in exfoliation (dispersion) of graphene and better interaction via chemical bonding with PVA chains as observed in the FTIR analysis. This results in a stronger and more thermally stable nanocomposite. However, further irradiation of G1 at 10 min and 15 mins leads to a decrease in the $I_D/I_G$ ratio as shown in Table 2. The decreasing behavior of the $I_D/I_G$ ratio may indicate that the transformation of the nano crystalline structure of graphene into an amorphous phase at higher irradiation times. This may result in weak and poor interaction of graphene with PVA chains and lead to a lower crystallinity of the nanocomposite.

TABLE 2

$I_D/I_G$ ratio of un-irradiated and irradiated nanocomposite

| Sample | D-Peak (~1357) | G-Peak (~1583) | $I_D/I_G$ |
|---|---|---|---|
| G1 | 69.17 | 216.58 | 0.31 |
| G5 | 74.42 | 227.23 | 0.32 |
| G10 | 87.32 | 192.34 | 0.45 |
| G1(5 M) | 126.70 | 229.94 | 0.55 |
| G1(10 M) | 76.41 | 229.10 | 0.33 |
| G1(15 M) | 67.72 | 255.76 | 0.26 |

XRD

Figure 5A:
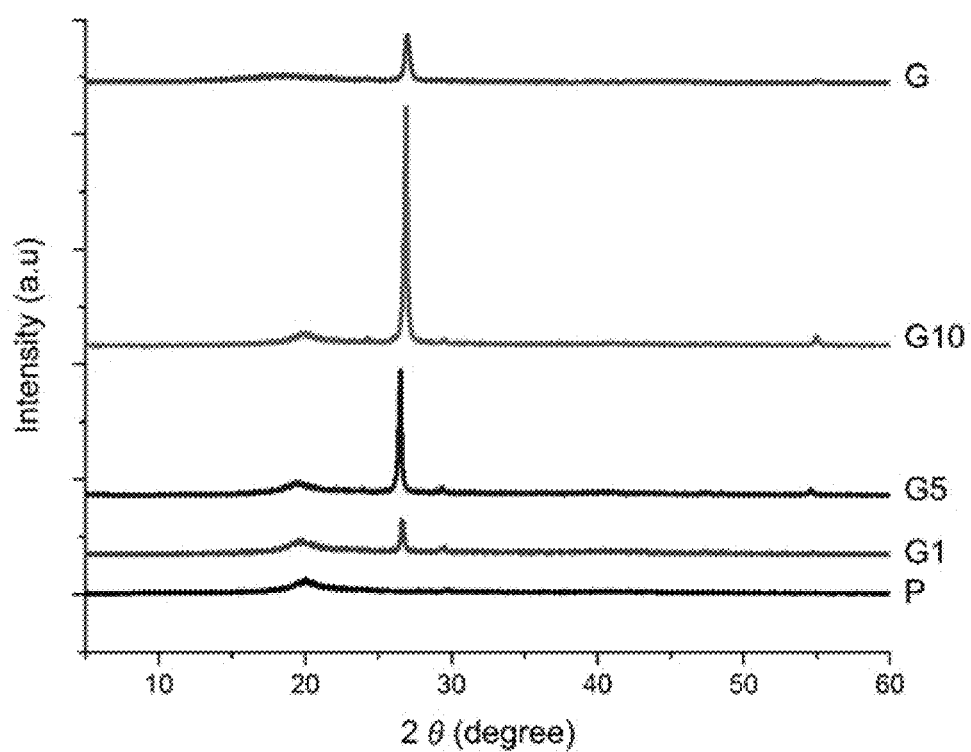
FIG. 5A shows XRD patterns of pure PVA, pure graphene and non-irradiated PVA/graphene samples.
Figure 5B:
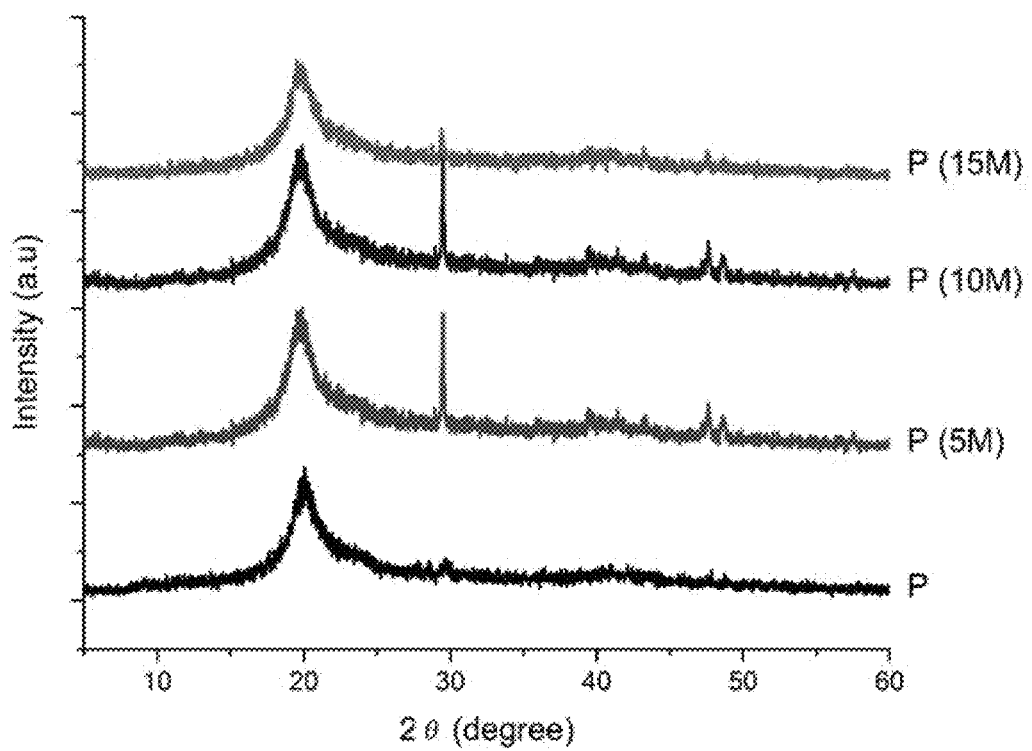
FIG. 5B shows XRD patterns of pure PVA and irradiated PVA samples.
Figure 5C:
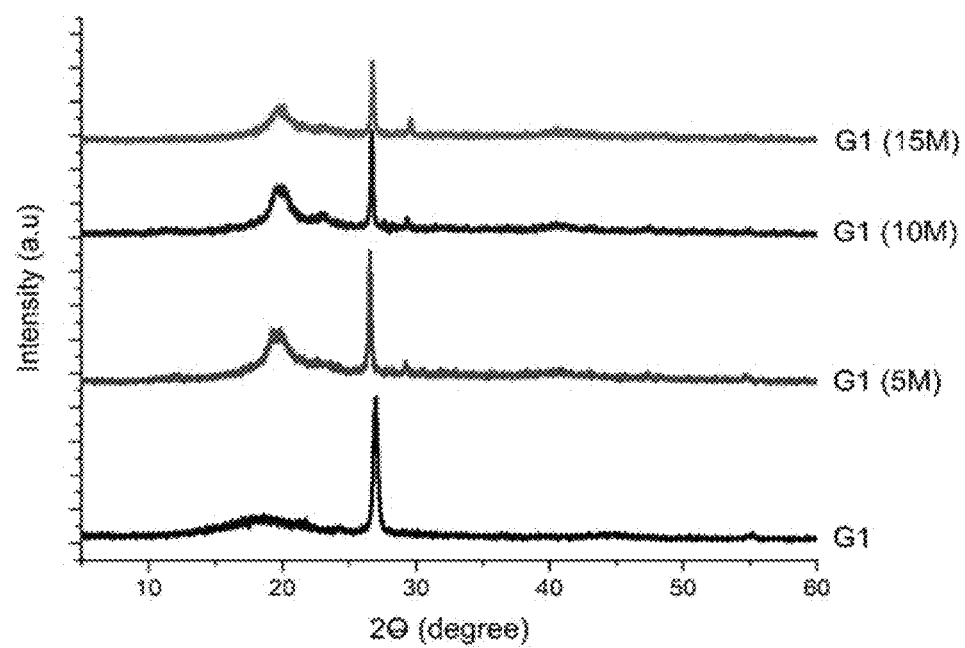
FIG. 5C shows XRD patterns of pure graphene and irradiated PVA/graphene nanocomposites.

X-ray diffraction (XRD) study is a useful tool to investigate the amorphous and crystalline nature of the polymer and composites. The XRD patterns of un-irradiated and irradiated samples are shown in FIGS. 5A-5C. Pure graphene shows a crystalline peak at 2Θ=26.4°. The PVA matrix shows a semi-crystalline peak at 2Θ=20°, while this peak shifted at 2Θ=19.5° in G1, G5, and G10 samples along with the graphene peak at 2Θ=26.4°. Moreover, the graphene peak intensity increases with the graphene percentage.

FIG. 5B shows XRD patterns for un-irradiated and irradiated pure PVA. A crystalline peak can be seen at 2Θ=29° in irradiated samples. Intensity of the peak decreases when radiation time increases from 5 min to 15 min along with a semi-crystalline peak at 2Θ=20° of the un-irradiated sample. The semi-crystalline peak was also suppressed with an increase in radiation time which indicates the conversion of a semi-crystalline structure to an amorphous phase. The additional peak appearing in irradiated samples also describes the change in structure caused by irradiation. This change may be due to the formation of crosslinking because of chain scission. Therefore, 5 min of irradiation transforms the structure to become more crystalline compared to an un-irradiated sample. However, further irradiation leads to an increase in the amorphous nature of the polymer and lowers the percentage crystallinity. See E. A. Bursali, et al., *Carbohydr. Polym.* 83 (2011) 1377 incorporated herein by reference in its entirety. Similarly, FIG. 5C shows the XRD patterns for G1 un-irradiated and irradiated samples. The peak associated with PVA shifted from 2Θ=19.5° to 2Θ=20.4° after irradiation along with an increase in intensity. This increase in peak intensity supports the improvement in crystallinity. However, this increase in intensity was suppressed after further irradiation for 10 min and 15 min and ultimately lowered the crystallinity. Nonetheless, irradiation leads to a decrease in the intensity of the graphene peak because of dispersion improvement (as conformed from SEM, FTIR, and Raman spectroscopy). The variation of XRD patterns indicates the modification in the microstructure of the PVA/graphene composite. These changes exhibit an interesting alteration in morphology and electrical properties.

Crystallinity

The effect of graphene on the percentage crystallinity of PVA was studied with the help of DSC. DSC data is summarized for original and irradiated samples in Table 3. A decrease in the degree of crystallinity has been observed with the incorporation of graphene. For example, the degree of crystallinity of PVA decreased from 55% to about 46% with incorporation of 1% graphene. The reduction continues with an increase in graphene contents (Table 3). Due to a high aspect ratio of graphene, it penetrates and forms hydroxyl bonding with the —OH group of PVA as indicated in FTIR results and restricts the dynamic movement of PVA chains in the nanocomposite. This restriction in dynamic movement causes the decrease in crystallinity. Similar results have been reported in literature for various polymer-graphene nanocomposites. See S. K. Sharma, et al., *Phys. Chem. Chem. Phys.* 17 (2015) 29201-29209; N. Thayumanavan, et al., *Cellul. Chem. Technol.* 49 (2015) 69-80; and Y. Zhu, et al., *Adv. Mater.* 22 (2010) 3906-3924—each incorporated herein by reference in its entirety.

After irradiation, the percentage crystallinity of PVA remains almost constant (Table 3). In contrast, after 5 mins irradiation, the G1 nanocomposites showed a substantial increase in crystallinity. See S. J. Zhang, et al., *Water Res.* 38 (2004) 309-316—incorporated herein by reference in its entirety. The degree of crystallinity of G1 increased to about 9% after 5 mins of irradiation. Low irradiation exposure (5 min) of G1 resulted in chain-scission produced short-length PVA chains and defects in graphene. See M. A. Al-Harthi, *Polym. Compos,* 35 (2014) 2036—incorporated herein by reference in its entirety. Therefore the chances of better chain arrangement of PVA chains and interaction of graphene with polymer matrix arises within the polymer nanocomposite. See M. A. Al-Harthi, *Polym. Compos.* 35 (2014) 2036 and V. M. Aslanian, et al., *Mater. Sci.* 28 (1987) 755—each incorporated herein by reference in its entirety. This increase in percentage crystallinity is also attributed to recrystallization of molecular chains under the influence of radiation. See A. Torikai, et al., *Polym. Degrad. Stab.* 16 (1986) 199-212—incorporated herein by reference in its entirety. However, higher irradiation (10 and 15 mins)

caused intense degradation of both PVA chains and crystalline graphene structure, which consequently reduced the crystallinity of G1. See S. Mishra, et al., *Express Polym. Lett.*, 1 (2007) 407—incorporated herein by reference in its entirety. Moreover, the melting point of G1 was decreased with irradiation (Table 3). As both crosslinking and degradation destroy the crystallographic phase, the melting point is eventually decreased. These results are in accordance with FTIR, XRD, Raman spectroscopy, and SEM.

TABLE 3

Percentage crystallinity and melting point ($T_m$) of original and irradiated samples

| Sample | % Crystallinity | $T_m$ (° C.) |
|---|---|---|
| P | 55 | 229 |
| P (5 M) | 56 | 228 |
| P (10 M) | 56 | 228 |
| P (15 M) | 54 | 226 |
| G1 | 46 | 230 |
| G1 (5 M) | 55 | 229 |
| G1 (10 M) | 49 | 227 |
| G1 (15 M) | 49 | 225 |
| G5 | 43 | 231 |
| G10 | 41 | 232 |

Nucleation Efficiency ($\eta_{mu}$)

Graphene nucleation efficiency was also studied. The following relationship (5) was used to calculate the nucleation efficiency:

$$\eta_{nu} = \frac{T_{c,N} - T_{c,PVA}}{T_{c,SN} - T_{c,PVA}} \times 100\% \quad (5)$$

Where $T_{c,N}$ and $T_{c,PVA}$ are the respective peak crystallization temperatures of PVA/graphene (original and irradiated) composites and pure PVA. $T_{c,SN}$ represents the self-nucleated PVA melt peak crystallization temperature. See M. Trujillo, et al., *Macromolecules* 40 (2007) 6268-6276—incorporated herein by reference in its entirety. For the calculation of $T_{c,SN}$, pure PVA (control sample) was heated up to 228° C. in a partial melt state at the constant heating rate of 10° C./min. See B. Fillon, et al., *J. Polym. Sci. Part B Polym. Phys.* 31 (1993) 1395-1405 and B. Fillon, et al., *J. Polym. Sci. Part B Polym. Phys.* 31 (1993) 1383-1393—each incorporated herein by reference in its entirety. The sample was kept isothermal for five minutes and then cooled at the rate of 10° C./min up to 0° C. The recorded $T_{c,SN}$ was 202.8° C. Favorable interaction within the crystal fragments and molten polymer in the presence of fragmented crystallites is an ideal process for self-nucleation. The values for $T_{c,peak}$ and $\eta_{mu}$ are listed in Table 4 below. From Table 4, more than 100% nucleation efficiency for all PVA/graphene nanocomposites can be observed. This effectiveness is attributed to a high aspect ratio of graphene as compared to pure PVA crystals. These unique characteristics of graphene cause the decrease in the free energy barrier and ultimately affect crystallization at higher temperatures. See S. Xin, et al., *J. Therm. Anal. Calorim.* 122 (2015) 379-391—incorporated herein by reference in its entirety. The decreases in nucleation efficiency in 5% and 10% nanocomposites are due to agglomeration of graphene nanoparticles at high percentages. In the same way, the increase in nucleation efficiency of the 5 min irradiated sample is attributed to improvements in dispersion of graphene within the composite. However, 10 min and 15 min irradiated samples show a decrease in efficiency due to degradation. These results are in accordance with FTIR, XRD, Raman spectroscopy, and SEM.

TABLE 3

Graphene nucleation efficiency in the PVA/graphene nanocomposites

| Sample | $T_{c,peak}$ (° C.) | $T_{c,N}$ (° C.) | $\eta_{nu}$, % |
|---|---|---|---|
| P | 202 | 201.7 | 0 |
| G1 | 204 | 206.32 | 420 |
| G1(5 M) | 204 | 207.72 | 547 |
| G1(10 M) | 203 | 203.37 | 152 |
| G1(15 M) | 203 | 203.34 | 149 |
| G5 | 203 | 205.18 | 316 |
| G10 | 203 | 202.84 | 103 |

DC Conductivity

Figure 6:
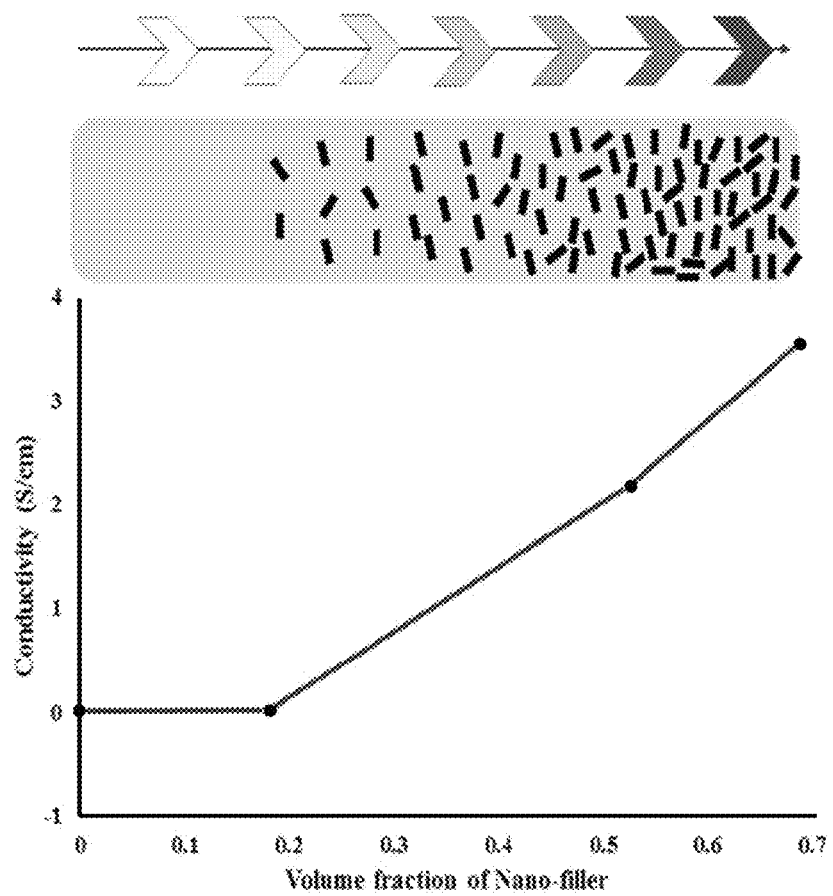
FIG. 6 shows the DC conductivity of the PVA/graphene nanocomposites with respect to the volume fraction of graphene.

DC conductivity values of PVA/graphene un-irradiated and irradiated composites are listed in Table 5. FIG. 6 depicts the DC conductivity of the PVA/graphene composites with respect to graphene content. The DC conductivity of the composites increases with the progressive increase in graphene content. A remarkable increase in DC conductivity value can be seen in the case of G5 compared to G1 followed by a high value of 3.55 S/cm for G10. Thus, the percolation limit of the conductive system was reached at around 0.52-0.69 volume fraction of graphene. In the case of G1, PVA acts as a continuous phase, while in G5 and G10, graphene becomes the continuous phase. As a electron mobility is high in graphene, this increases the conductivity of the composite as the amount of graphene increases.

In the case of the irradiated samples of G1, there is a slight increase in conductivity with irradiation time. This increase in conductivity is due to the breakage of graphene clusters in G1 and the subsequently improvement in dispersion due to irradiation as observed in SEM, FTIR, and XRD analysis.

TABLE 5

DC conductivity values for un-irradiated and irradiated samples.

| Sample Name | DC Conductivity (S/cm) |
|---|---|
| P | 0 |
| G1 | 0.021 |
| G1 (5 M) | 0.027 |
| G1 (10 M) | 0.032 |
| G1 (15 M) | 0.039 |
| G5 | 2.17 |
| G10 | 3.55 |
| G20 | 44.2 |

Electromagnetic Interference Shielding Effectiveness (EMI SE)

Figure 7A:
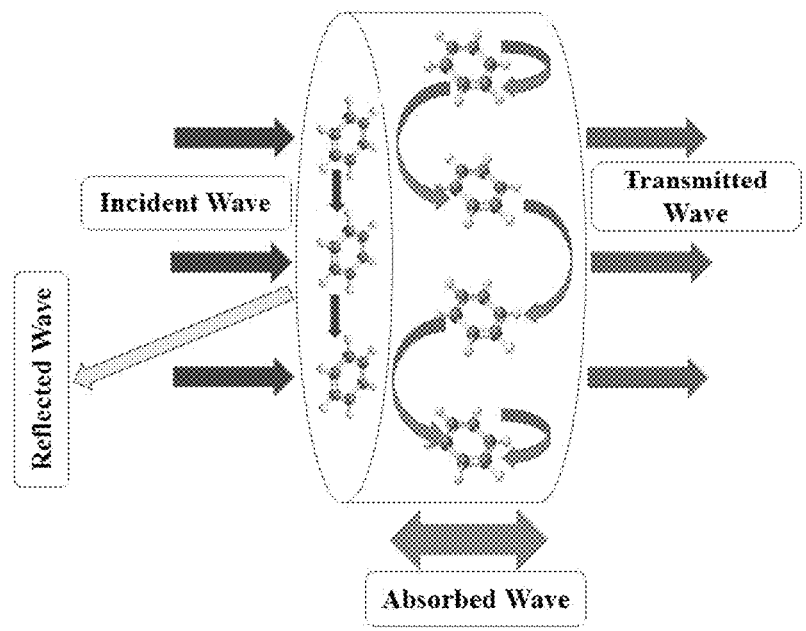
FIG. 7A shows a schematic representation of various attenuation mechanisms of the nanocomposite.
Figure 7B:
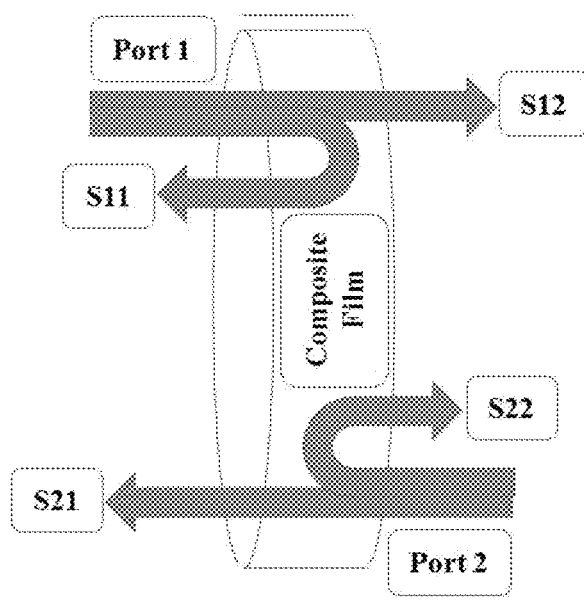
FIG. 7B shows a schematic representation of the S-parameters measured on a nanocomposite sample by a two-port vector network analyzer.
Figure 8A:
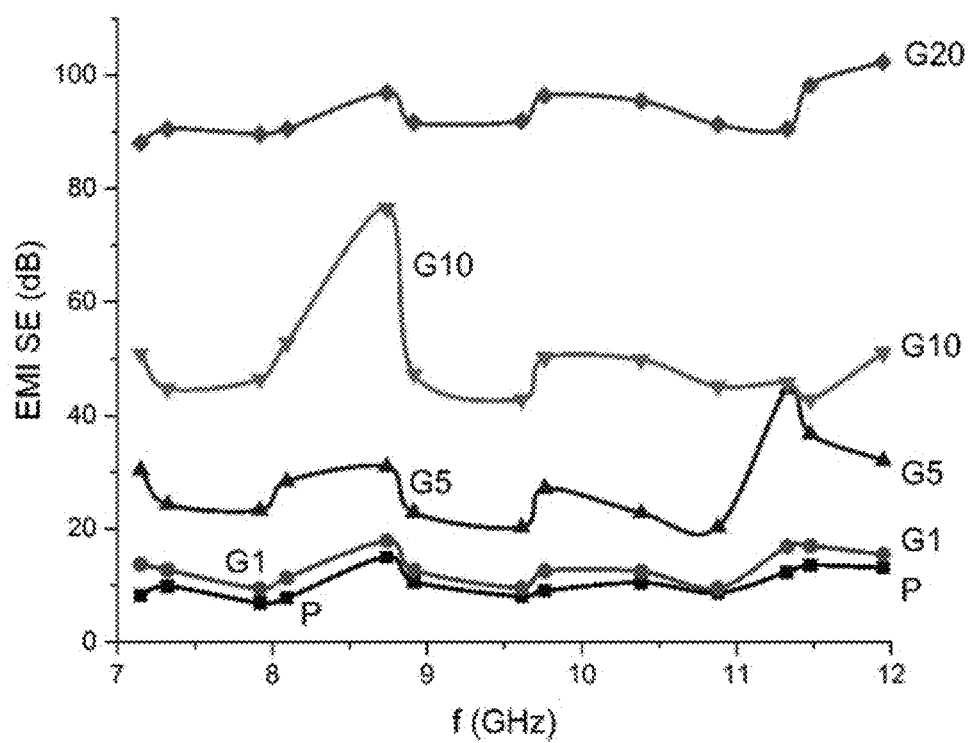
FIG. 8A shows electromagnetic interference shielding effectiveness (dB) of pure PVA and non-irradiated PVA/graphene samples versus frequency (GHz).
Figure 8B:
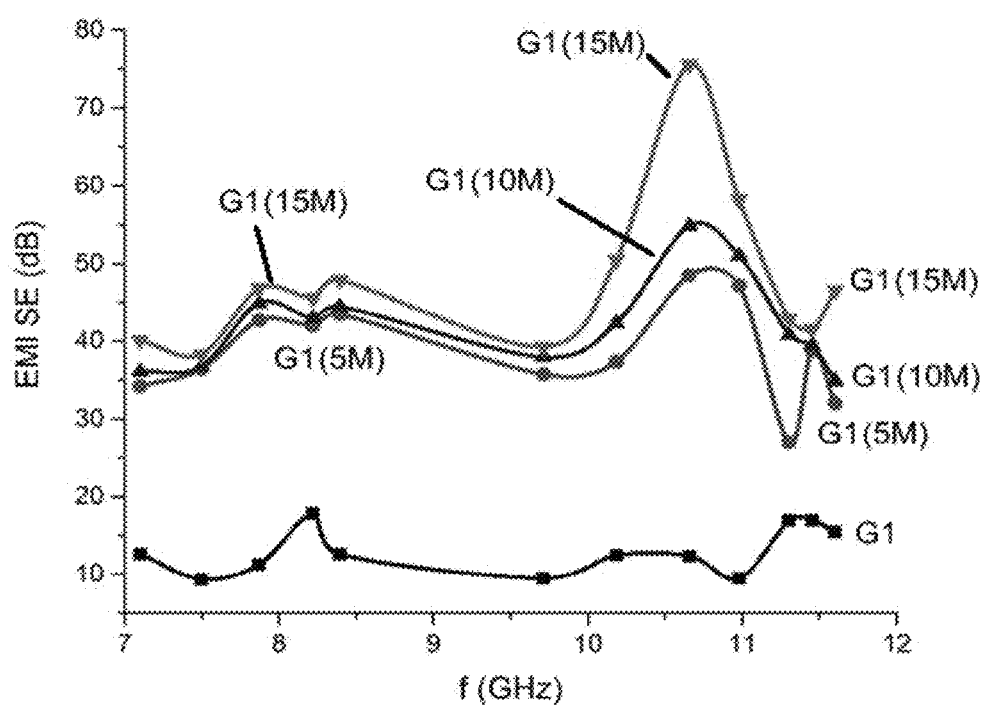
FIG. 8B shows electromagnetic interference shielding effectiveness (dB) of non-irradiated and irradiated G1 samples versus frequency (GHz).

The EMI SE was measured using a vector network analyzer (VNA) for different graphene nanocomposites over X-band frequencies. Materials having high SE over X-band frequencies are relevant to various military and commercial instruments operated under this range. The total SE can be estimated by scattering (S) parameters provided by the VNA. Relationship (6) was utilized to calculate the SE.

$$SE_T(dB) = 10\log \cdot \frac{1}{|S_{21}|^2} = 10\log \cdot \frac{1}{|S_{12}|^2} \quad (6)$$

Where $S_{12}$ and $S_{21}$ correspond to the coefficients of reverse transmission and coefficients of forward transmission, respectively. FIG. 7A describes the multiple attenuation mechanisms during SE measurement using polymer nanocomposites containing conducting nano-filler. FIG. 7B illustrates the measurement of S-parameters by a two-port VNA. FIG. 8A shows the EMI SE of un-irradiated samples while FIG. 8B shows the EMI SE of irradiated G1 samples. It is interesting to see that the SE of the composites increases with an increase in graphene content. The SE increase relates to the increasing electrical conductivity. See S. P. Pawar, et al., *Phys. Chem. Chem. Phys.* 17 (2015) 14922-14930—incorporated herein by reference in its entirety. Graphene nanoparticles form a continuous conducting network by distributing itself within the polymer matrix which then behaves like a conducting mesh. Generally the SE is determined by the mesh size as it is the mesh that intercepts electromagnetic radiation. By increasing the nano-filler concentration, a finer and more compact mesh is produced (as shown in SEM analysis), with the result of better SE. See N. J. S. Sohi, et al., *Polym. Compos.* 32 (2011) 1148-1154—incorporated herein by reference in its entirety. However, higher loading imposes the adverse effect on mechanical properties of the nanocomposites.

In the case of irradiated composites it can be seen from FIG. 8B that with the increase in irradiation time, the EMI SE increases. This increase in SE correlates with improvement in dispersion due to irradiation, which results in a better distribution of conductive filler in the polymer matrix. These results are analogous to SEM, FTIR, and XRD analysis along with the electrical conductivity measurement. Thus, interestingly, when prepared composites were exposed to microwave radiation their EMI SE increases with the passage of time along with conductivity.

Figure 9:
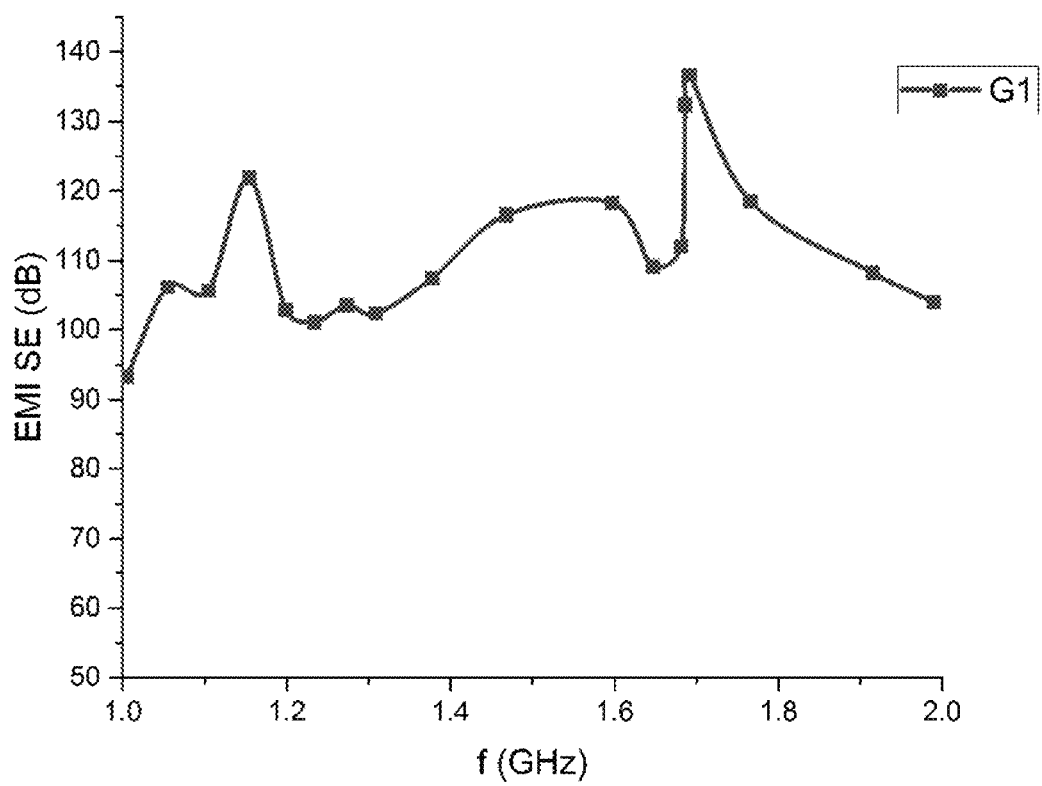
FIG. 9 shows electromagnetic interference shielding effectiveness (dB) of the non-irradiated G1 sample versus frequency (GHz), at a lower frequency range.

Moreover, FIG. 9 shows the EMI SE of sample G1 over 1-2 GHz, which covers small electronics. The excellent result was found with even the low filler loading sample which had almost more than a 100 dB EMI SE for frequency 1-2 GHz. Thus, the current invention can play a vital role in EMI SE not specific to a wide frequency range.

Reduction in crystallinity of PVA was observed with incorporation of graphene. Decrease in PVA crystallinity was due to restriction in the dynamic movement of chains. Microwave irradiation caused an increase in the percentage crystallinity from 46% to 55% of G1 (5M) due to improvement in graphene dispersion. Similarly, a slight increase in percentage crystallinity after irradiation of the neat polymer was also observed. Irradiation times of 10 min and 15 min resulted in a decrease in the crystallinity of G1 due to degradation of the nanocomposite structure. Moreover, nucleation efficiency of graphene increased from 420% to 547% of G1 (5M) because of improved dispersion and interaction of graphene. However, further irradiation for 10 and 15 min resulted in the decrease in nucleation efficiency due to degradation.

DC electrical conductivities of the PVA nanocomposites were increased through the graphene incorporation from 0 S/cm (for pure PVA) to 3.55 S/cm after 10 wt % graphene incorporation. The nanocomposite reached a percolation threshold with 5% graphene contents in the matrix. This improvement in electrical conductivity is due to high π electron mobility in graphene, which provides electricity transmission. Microwave irradiation improved the DC conductivity of the G1 (15M) composite from 0.021 S/cm to 0.039 S/cm after 15 min due to improvement of nano-filler dispersion. Similarly, electromagnetic interference shielding effectiveness improved strikingly by the incorporation of graphene nanoparticles which formed a continuous conducting network by distributing itself within the polymer matrix and behaving like a conducting mesh. EMI SE increased from 15 dB to 76.5 dB at 8.7 GHz for the G10 nanocomposite. Substantial improvement in the EMI SE was also found after irradiation of the G1 nanocomposite. The EMI SE increased from 12.4 dB to 75.5 dB at 10.6 GHz for the G1 (15M) nanocomposite. This EMI SE enhancement in irradiated samples is due to the breakage of graphene clusters. This breakage of graphene clusters leads to better distribution and more interception of the graphene clusters with electromagnetic radiation.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for producing a PVA/graphene film, comprising:
   dispersing poly(vinyl alcohol) and graphene nanoplatelets in water to form a mixture, wherein a mass ratio of poly(vinyl alcohol) to graphene nanoplatelets in the mixture is 80:1-110:1, and drying the mixture to produce a cast film,
   exposing the cast film to a microwave radiation of 100-300 W for 3-20 minutes to form the PVA/graphene film,
   wherein an electromagnetic interference shielding effectiveness of the PVA/graphene film is 90-140 dB for an electromagnetic radiation in the range of 0.8-2.5 GHz.

2. The method of claim 1, wherein the poly(vinyl alcohol) has a weight average molecular weight of 85-105 kDa.

3. The method of claim 1, wherein the graphene nanoplatelets have a thickness of 40-110 nm.

4. The method of claim 1, wherein the graphene nanoplatelets have a length to thickness aspect ratio of 40:1-1,200:1.

5. The method of claim 1, further comprising degassing the mixture before the drying.

6. The method of claim 1, wherein the drying is at 20-27° C. and 0.85-1.10 atm for 3-7 days.

7. The method of claim 1, wherein the mass ratio of poly(vinyl alcohol) to graphene nanoplatelets in the mixture is 80:1-110:1, and wherein the cast film is exposed to the microwave radiation for 3-7 minutes.

8. The method of claim 7, wherein the PVA/graphene film has an electromagnetic interference shielding effectiveness of 30-50 dB for an electromagnetic radiation in the range of 5.0-12.0 GHz.

9. The method of claim 7, wherein the exposing increases a graphene nucleation efficiency of the PVA/graphene film to 500-570% from a graphene nucleation efficiency of 380-480% of the film.

10. The method of claim 7, wherein the exposing increases a percentage crystallinity of the PVA/graphene film to 51-60% from a percentage crystallinity of 40-50% of the film.

11. The method of claim 7, wherein the exposing increases a Raman $I_D/I_G$ ratio of the PVA/graphene film to 0.45-0.65 from an $I_D/I_G$ ratio of 0.25-0.40 of the film.

12. The method of claim 7, wherein the PVA/graphene film has a peak crystallization temperature of 202-206° C.

13. The method of claim 7, wherein the PVA/graphene film has a melting point of 227-231° C.

14. The method of claim 1, wherein the PVA/graphene film has an electrical conductivity of 0.029-0.050 S/cm.

15. The method of claim 1, wherein the microwave radiation has a frequency in a range of 2200-2700 MHz.

16. The method of claim 1, wherein the graphene nanoplatelets have a thickness of 40-110 nm and a length to thickness aspect ratio of 40:1-1,200:1, and
wherein the PVA/graphene film has a bilayer structure with a PVA enriched layer and a graphene enriched layer.

17. The method of claim 16, wherein the PVA enriched layer has a thickness of 135-400 μm, and the graphene enriched layer has a thickness of 4-10 μm.

* * * * *